US011181406B2

(12) United States Patent
Loos et al.

(10) Patent No.: US 11,181,406 B2
(45) Date of Patent: Nov. 23, 2021

(54) ULTRASONIC MASS FUEL FLOW METER

(71) Applicant: Woodward, Inc., Fort Collins, CO (US)

(72) Inventors: Jordan Loren Loos, Rockford, IL (US); Gregory Warren Pulley, Loveland, CO (US); Michael L. Hahn, Loves Park, IL (US)

(73) Assignee: Woodward, Inc., Fort Collins, CO (US)

( * ) Notice: Subject to any disclaimer, the term of this patent is extended or adjusted under 35 U.S.C. 154(b) by 210 days.

(21) Appl. No.: 16/702,152

(22) Filed: Dec. 3, 2019

(65) Prior Publication Data

US 2021/0164816 A1 Jun. 3, 2021

(51) Int. Cl.
G01F 1/66 (2006.01)
G01F 1/78 (2006.01)

(52) U.S. Cl.
CPC ............. G01F 1/662 (2013.01); G01F 1/667 (2013.01); G01F 1/78 (2013.01)

(58) Field of Classification Search
CPC ............. G01F 1/662; G01F 1/667; G01F 1/78
See application file for complete search history.

(56) References Cited

U.S. PATENT DOCUMENTS

| 3,925,692 | A | 12/1975 | Leschek et al. |
| 7,600,417 | B2 | 10/2009 | Paradise |
| 7,954,387 | B1 | 6/2011 | Furlong et al. |
| 9,182,259 | B2 * | 11/2015 | Suzuki ...................... G01F 1/66 |
| 9,239,337 | B2 * | 1/2016 | Mueller .................. G01F 1/662 |
| 9,261,389 | B2 * | 2/2016 | Gill .......................... G01F 1/662 |
| 9,267,833 | B2 * | 2/2016 | Ohmiya ............... G01L 19/0023 |
| 9,297,680 | B2 * | 3/2016 | Maruyama .............. G01F 1/662 |
| 9,891,085 | B2 | 2/2018 | Muhammad et al. |
| 2004/0093957 | A1 * | 5/2004 | Buess ...................... G01F 1/662 |
| | | | 73/861.27 |

(Continued)

FOREIGN PATENT DOCUMENTS

| DE | 19710296 | 3/1998 |
| DE | 102016105338 | 9/2017 |

(Continued)

OTHER PUBLICATIONS

PCT International Search Report and Written Opinion in International Appln. No. PCT/US2020/063013, dated May 11, 2021, 21 pages.

(Continued)

Primary Examiner — Freddie Kirkland, III
(74) Attorney, Agent, or Firm — Fish & Richardson P.C.

(57) ABSTRACT

The subject matter of this specification can be embodied in, among other things, a method of sensing that includes activating a first emitter to emit at least one incident wave, transmitting the incident wave along a buffer rod having a first axial end abutted to the first emitter and a second axial end opposite the first axial end, reflecting a first echo of the incident wave by a gap defined along a portion of the buffer rod, detecting the first echo, determining a first amplitude of the first echo, reflecting a second echo of the incident wave by the second axial end, detecting the second echo, determining a second amplitude of the second echo, and determining a reflection coefficient based on the first amplitude and the second amplitude.

17 Claims, 10 Drawing Sheets

(56) References Cited

U.S. PATENT DOCUMENTS

| | | |
|---|---|---|
| 2005/0016281 A1 | 1/2005 | Hill et al. |
| 2007/0227263 A1* | 10/2007 | Fukano .................. G01F 1/662 |
| | | 73/861.27 |
| 2014/0198822 A1 | 7/2014 | Lei et al. |
| 2014/0260513 A1 | 9/2014 | Smirnov et al. |
| 2015/0082913 A1 | 3/2015 | Maruyama et al. |
| 2018/0306625 A1 | 10/2018 | Baker |

FOREIGN PATENT DOCUMENTS

| | | |
|---|---|---|
| DE | 202017007116 | 8/2019 |
| EP | 1279368 | 1/2003 |
| EP | 2827111 | 1/2015 |
| EP | 3222980 | 9/2017 |
| WO | WO2009071746 | 6/2009 |

OTHER PUBLICATIONS

Hoche et al., "Ultrasound-Based Density Determination via Buffer Rod Techniques", J. Sens. Syst., 2013, 2:103-125.

Kazys et al., "Ultrasonic Technique for Density Measurement of Liquids in Extreme Conditions", Sensors, 2015, 15:19393-19415.

Nakamura, "Ultrasonic Transducers: Materials and Design for Sensors, Actuators and Medical Applications", Woodhead Publishing, 2012.

PCT Invitation to Pay Additional Fees, and, Where Applicable, Protest Fee in International Appln. No. PCT/US2020/063013, dated Mar. 19, 2021, 16 pages.

PCT International Search Report and Written Opinion in International Appln. No. PCT/US2021/021103, dated Jun. 16, 2021, 14 pages.

\* cited by examiner

ULTRASONIC MASS FUEL FLOW METER

TECHNICAL FIELD

This instant specification relates to ultrasonic fluid mass flow sensors.

BACKGROUND

Fluid measurement devices are used for the characterization and operation of fluid control systems. As the dynamic bandwidths, flow ranges, accuracies, and reliabilities of flow measurement devices improve, the potential application landscape of such devices broadens. High dynamic bandwidth flow meters can be used as control system feedback sensors for improving steady state and/or transient accuracy in fuel systems. Ultrasonic flow meters (USFM) are a proven industrial technology that can be leveraged for implementation to aircraft turbine systems.

Existing time of flight ultrasonic flow meters are used in the racing and automotive industries, pipeline custody transfer, industrial flow measurement, and many other applications. However, many of these applications encompass steady-state flow conditions, and their respective applications allow for volumetric flow measurement. In other applications, such as aircraft gas turbine engine applications, the fluid environmental conditions of the fuel delivery system imposes significant design challenges.

SUMMARY

In general, this document describes ultrasonic fluid mass flow sensors.

In one aspect, a sensor includes a sensor housing having an interior surface defining a sensor axis and an axial interior sensor housing cavity having a first axial sensor housing portion having a first cross-sectional area perpendicular to the sensor axis, a second axial sensor housing portion arranged adjacent to the first axial sensor housing portion along the sensor axis and having a second cross-sectional area larger than the first cross-sectional area perpendicular to the sensor axis, and a face extending from the interior surface of the first axial housing portion to the interior surface of the second axial housing portion, a buffer rod having a first axial end and a second axial end opposite the first axial end and having a first axial buffer portion arranged within the first housing portion and having the first axial end, a second axial buffer portion arranged within the second housing portion and abutting the face, and having the second axial end, and a third axial buffer portion, extending axially between the first axial buffer portion and the second axial buffer portion, and having a third cross-sectional area, smaller than the first cross-sectional area, perpendicular to the sensor axis, a cavity defined between the interior surface and the third axial buffer portion, and an acoustic transceiver element acoustically mated to the first end.

Various embodiments can include some, all, or none of the following features. The acoustic transceiver element can be configured to emit a vibration having a predetermined wavelength ($\lambda$), and the buffer rod has an axial length of about a round multiple of $n/2\lambda$. The third cross-sectional area can be about half as large as the first cross-sectional area. The sensor can also include a tubular fluid conduit having a first end and a second end opposite the first end and defining a conduit axis, arranged such that the conduit axis is substantially aligned with the sensor axis. The sensor can also include another sensor housing having another interior surface defining another sensor axis and another axial interior sensor housing cavity including another first axial sensor housing portion having another first cross-sectional area perpendicular to the other sensor axis, another second axial sensor housing portion arranged adjacent to the other first axial sensor housing portion along the other sensor axis and having another second cross-sectional area larger than the other first cross-sectional area perpendicular to the other sensor axis, and another face extending from the other interior surface of the other first axial housing portion to the other interior surface of the other second housing portion, another buffer rod having another first axial end and another second axial end opposite the other first axial end and including another first axial buffer portion arranged within the other first housing portion and having the other first axial end, another second axial buffer portion arranged within the other second housing portion and abutting the other face, and having the other second axial end, and another third axial buffer portion, extending axially between the other first axial buffer portion and the other second axial buffer portion, and having another third cross-sectional area, smaller than the other first cross-sectional area, perpendicular to the other sensor axis, another cavity defined between the other interior surface and the other third axial buffer portion, and another acoustic transceiver element acoustically mated to the other first end, wherein the other sensor axis is substantially aligned with the conduit axis. The sensor can also include a fluid housing including a fluid housing interior surface defining an axial fluid housing cavity, a first fluid port in fluidic communication with the axial fluid housing cavity, and a second fluid port in fluidic communication with the axial fluid housing cavity, wherein the tubular fluid conduit is in fluidic communication with the second fluid port and extends axially away from the fluid housing along the conduit axis at the first end, and the sensor housing is arranged within the first fluid housing such that the sensor axis is substantially aligned with the conduit axis. The sensor can also include another sensor housing having another interior surface defining another sensor axis and another axial interior sensor housing cavity including another first axial sensor housing portion having another first cross-sectional area perpendicular to the other sensor axis, another second axial sensor housing portion arranged adjacent to the other first axial sensor housing portion along the other sensor axis and having another second cross-sectional area larger than the other first cross-sectional area perpendicular to the other sensor axis, and another face extending from the other interior surface of the other first axial housing portion to the other interior surface of the other second housing portion, another buffer rod having another first axial end and another second axial end opposite the other first axial end and including another first axial buffer portion arranged within the other first housing portion and having the other first axial end, another second axial buffer portion arranged within the other second housing portion and abutting the other face, and having the other second axial end, and another third axial buffer portion, extending axially between the other first axial buffer portion and the other second axial buffer portion, and having another third cross-sectional area, smaller than the other first cross-sectional area, perpendicular to the other sensor axis, another cavity defined between the other interior surface and the other third axial buffer portion, another acoustic transceiver element acoustically mated to the other first end, and another fluid housing having another fluid housing interior surface defining another axial fluid housing cavity, another first fluid port in fluidic communication with the other axial fluid housing cavity, and another second fluid port in fluidic communication with the other axial fluid housing cavity, wherein the tubular fluid conduit is in fluidic communication with the other second fluid port and extends axially away from the other fluid housing along the conduit axis at the second end, and the other sensor housing is arranged within the other first fluid housing such that the other sensor axis is substantially aligned with the conduit axis. The acoustic transceiver element can include a piezoelectric element. The sensor can also include a matching layer affixed to the second end and having a thickness of about an odd multiple of $1/4\lambda$. The sensor can also include a backing abutted to the acoustic transceiver element axially opposite the first end.

In another aspect, a sensor system includes a fluid housing having a first fluid housing portion defining a first axial fluid housing cavity and having a first fluid port in fluidic communication with the first axial fluid housing cavity, a second fluid housing portion defining a second axial fluid housing cavity and having a second fluid port in fluidic communication with the second axial fluid housing cavity, and a tubular fluid conduit in fluidic communication with the first fluid port at a first end and in fluidic communication with the second fluid port at a second end opposite the first end, and defining a conduit axis, a first acoustic transceiver element arranged within the first axial fluid housing cavity, axially aligned with the conduit axis, and a second acoustic transceiver element arranged within the second axial fluid housing cavity, axially aligned with the conduit axis.

Various embodiments can include some, all, or none of the following features. The sensor system can also include circuitry configured to activate the first acoustic transceiver element to emit a first incident wave, activate the second acoustic transceiver element to emit a second incident wave, detect, by the first acoustic transceiver element, an echo of the first incident wave, determine a fluid acoustic impedance of a fluid in the tubular fluid conduit based on the echo, detect, by the second acoustic transceiver element, at least a first portion of the first incident wave, determine a first time of flight of the portion of the first portion, detect, by the first acoustic transceiver element, at least a second portion of the second incident wave, determine a second time of flight of the second portion, determine a mass fluid flow rate based on the determined fluid acoustic impedance, the determined first time of flight, and the determined second time of flight. One or both of the first sensor or the second sensor can include a sensor housing having an interior surface defining a sensor axis and an axial interior sensor housing cavity having a first axial sensor housing portion having a first cross-sectional area perpendicular to the sensor axis, a second axial sensor housing portion arranged adjacent to the first axial sensor housing portion along the sensor axis and having a second cross-sectional area larger than the first cross-sectional area perpendicular to the sensor axis, and a face extending from the interior surface of the first axial housing portion to the interior surface of the second housing portion, a buffer rod having a first axial end and a second axial end opposite the first axial end and having a first axial buffer portion arranged within the first housing portion and having the first axial end, a second axial buffer portion arranged within the second housing portion and abutting the face, and having the second axial end, and a third axial buffer portion, extending axially between the first axial buffer portion and the second axial buffer portion, and having a third cross-sectional area, smaller than the first cross-sectional area, perpendicular to the sensor axis, a cavity defined between the interior surface and the third axial buffer portion, and an acoustic transceiver element acoustically mated to the first end. The acoustic transceiver element can be configured to emit a vibration having a predetermined wavelength ($\lambda$), and the buffer rod can have an axial length of about a round multiple of $n/2\lambda$. The third cross-sectional area can be about half as large as the first cross-sectional area. The acoustic transceiver element can include a piezo element. The sensor system can also include a matching layer affixed to the second end and having a thickness of about an odd multiple of $1/4\lambda$. The sensor system can also include a backing abutted to the acoustic transceiver element axially opposite the first end.

In another aspect, a method of sensing includes activating a first emitter to emit at least one incident wave, transmitting the incident wave along a buffer rod having a first axial end abutted to the first emitter and a second axial end opposite the first axial end, reflecting a first echo of the incident wave by a gap defined along a portion of the buffer rod, detecting the first echo, determining a first amplitude of the first echo, reflecting a second echo of the incident wave by the second axial end, detecting the second echo, determining a second amplitude of the second echo, and determining a reflection coefficient based on the first amplitude and the second amplitude.

Various implementations can include some, all, or none of the following features. The method can also include determining a fluid acoustic impedance of a fluid at the second axial end based on the determined reflection coefficient and a predetermined buffer rod acoustic impedance. The method can also include transmitting, at the second axial end, a portion of the incident wave through the fluid to a sensor arranged a predetermined distance away from and opposite the first emitter, wherein the fluid is within a tubular fluid conduit having a predetermined cross-sectional area, detecting, by the second sensor, the portion of the incident wave, determining, based on the detected portion of the incident wave, a first time of flight of the portion of the incident wave, transmitting, by a second emitter, another incident wave through the fluid to the first sensor, detecting, by the first sensor, the other incident wave, and determining, based on the detected other incident wave, a second time of flight of the other incident wave. The method can also include determining at least one of a velocity of the fluid within the tubular fluid conduit or a speed of sound within the fluid based on the first time of flight, the second time of flight, and the predetermined distance. The method can also include determining a mass fluid flow rate based on the predetermined cross-sectional area, and the determined speed of sound. Reflecting the second echo of the incident wave by the second axial end can also include reflecting the second echo by a $1/4\lambda$ matching layer affixed to the second axial end. One or both of the first emitter and the first sensor can include piezo elements. A piezo element can include the first emitter and the first sensor.

In another aspect, a method of protecting a sensor element includes providing a sensor having a sensor housing having an interior surface defining a sensor axis and an axial interior sensor housing cavity having a first axial sensor housing portion having a first cross-sectional area perpendicular to the sensor axis, a second axial sensor housing portion arranged adjacent to the first axial sensor housing portion along the sensor axis and having a second cross-sectional area larger than the first cross-sectional area perpendicular to the sensor axis, and a face extending from the interior surface of the first axial housing portion to the interior surface of the second housing portion, a buffer rod having a first axial end and a second axial end opposite the first axial end and including a first axial buffer portion arranged within the first housing portion and having the first axial end, a second axial buffer portion arranged within the second housing portion and abutting the face, and having the second axial end, and a third axial buffer portion, extending axially between the first axial buffer portion and the second axial buffer portion, and having a third cross-sectional area, smaller than the first cross-sectional area, perpendicular to the sensor axis, and an acoustic transceiver element acoustically mated to the first end, providing a fluid at second axial end, and blocking, by the buffer rod and the sensor housing, fluid flow from the second end to the acoustic transceiver element.

Various implementations can include some, all, or none of the following features. Fluid flow from the second end to the acoustic transceiver element can be blocked by the sensor housing and the second axial buffer portion. The method can also include applying fluid pressure against the second axial end to produce an axial force against the buffer rod, transmitting, by the buffer rod, the axial force to the sensor housing, and preventing, by the sensor housing, transmission of the axial force to the acoustic transceiver element. The method can also include transmitting, by the second axial portion, the axial force to the face, wherein the face interferes with axial movement of the buffer rod toward the acoustic transceiver element.

The systems and techniques described here may provide one or more of the following advantages. First, a system can provide improved environmental survivability against wide fluid temperature ranges. Second, the system can provide improved environmental survivability against wide fluid pressure ranges. Third, the system can provide improved environmental survivability against harsh fluids. Fourth, the system can provide integral fluid density sensing. Fifth, the system can be relatively unaffected by fluid flow dynamics (e.g., swirl, vortices, instability). Sixth, the system can be used with update rates of 100 Hz or greater, while maintaining accuracy.

The details of one or more implementations are set forth in the accompanying drawings and the description below. Other features and advantages will be apparent from the description and drawings, and from the claims.

DETAILED DESCRIPTION

Figure 1:
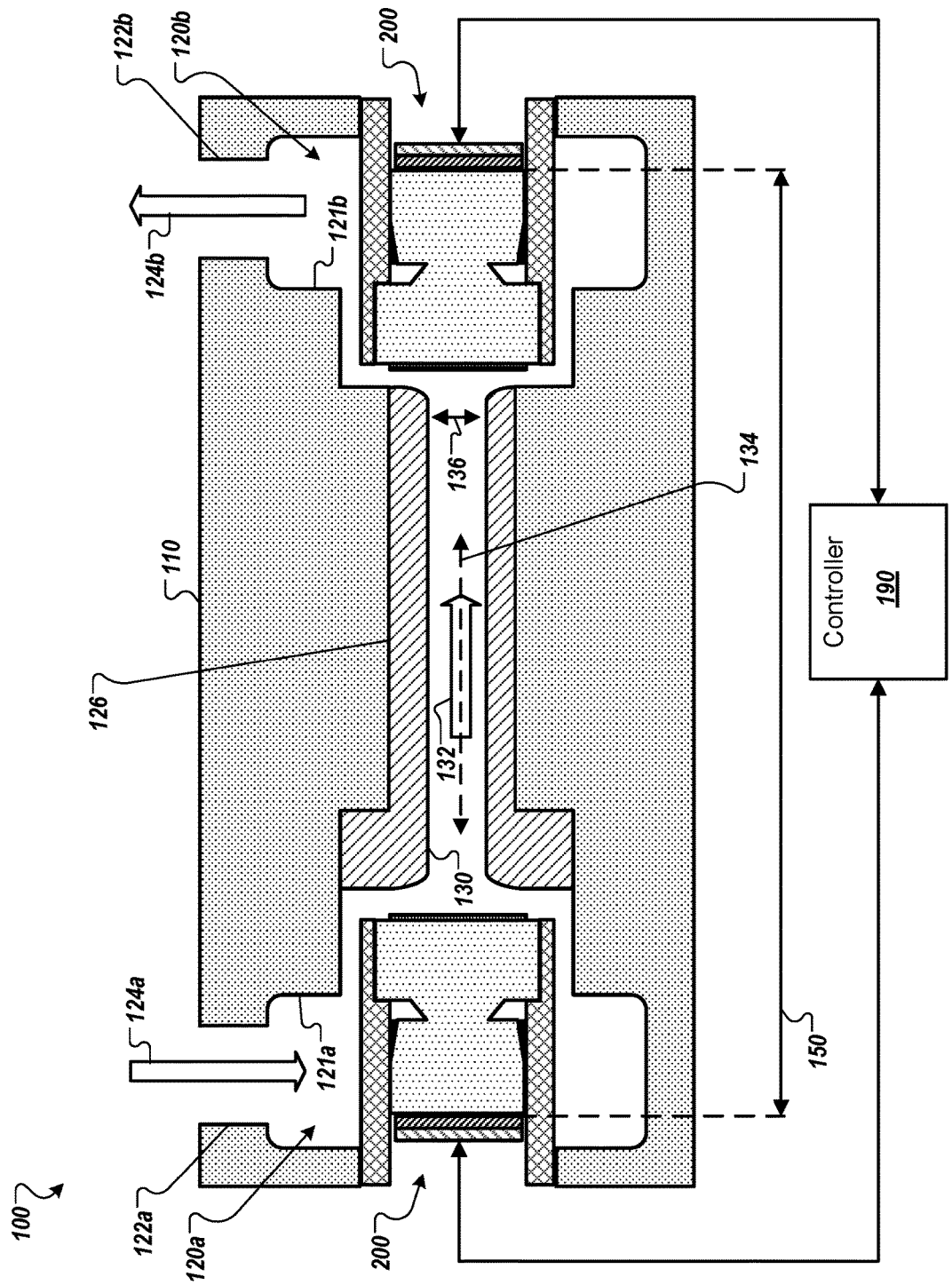
FIG. 1 is a cross-sectional diagram an example of an ultrasonic flow measurement system.

This document describes ultrasonic fluid mass flow sensor (USFM) systems, and techniques for measuring fluid flow characteristics of fluids. In general, the USFM systems described in this system can be used in fluid environments that would degrade or destroy existing USFMs. The fluid environmental conditions of fuel delivery systems can impose significant design challenges. For current, state of the art, aircraft and other gas turbine engine applications, an ultrasound transducer deployed for such applications will be expected to survive high fluid pressures (e.g., 0 psi to 4000 psi or higher) and a wide range of fluid temperatures, including high fluid temperatures (e.g., −65 degrees F. or lower to 325 degrees F. or higher).

These temperatures and pressures are far more challenging than those required in typical industrial fluid, steam, or pipeline custody transfer applications. To remain effective in such applications, a wetted transducer must also not be degraded by long-term immersion in caustic fluids such as aircraft fuels and/or additives at high temperatures and/or pressures. The USFM systems described in this document include features that improve the survivability of the USFM under such conditions.

In existing industrial and custody transfer USFMs based on time of flight, cross-correlation, and phase shift measurements have accuracy limitations determined by the flow velocity range, or turn-down ratio, within the flow measurement volume. For example, during low flow conditions the difference between upstream and downstream measurements can be too insensitive to maintain a target accuracy. During high flow conditions, measurement accuracy can suffer from flow instabilities, often caused by the acoustic path being off-axis with respect to the flow, flow separation, and/or non-axisymmetric flow conditions. Off-axis transducer configurations can also cause sensitivity and accuracy problems. Round transducers can impose non-uniform ultrasound fields as the waves pass diagonally through the flow, reducing accuracy. In existing USFMs having ultrasound beams smaller than the flow cross-section, the full flow profile is not insonified and therefore must be estimated, typically with a single K-factor correction value, or a complex coefficient matrix for USFMs using multiple sonic paths, such as in natural gas custody transfer applications. In existing USFM designs, flow measurement accuracy can be difficult to maintain over a large turndown ratio when the flow regime is unstable, or changes substantially from laminar to turbulent flow. For example, some existing industrial USFMs have a practical turndown ratio of no more than 50:1 while maintaining accuracy, even when application piping and flow conditioning are executed ideally. By comparison, a gas turbine fuel system can require a substantially higher turndown of generally 100:1, with some applications upward of 350:1 or more. In addition, a gas turbine flow measurement system must be capable of maintaining dynamic accuracy, with update rates of 100 Hz or more.

Mass flow is critical to the combustion process to maintain a safe and operable fuel to air ratio. Excess fuel to air ratio can lead to compressor surge or over temperature events. Conversely, excess air to fuel can lead to compressor blow out. Either of these events can be detrimental to gas turbine performance and are therefore key design drivers for gas turbine engine design. Additionally, some applications such as gas turbine engines are designed to operate on various fuel types under varying pressures and temperatures.

An important variable, especially in aircraft gas turbine applications, is the variation in fuel specific gravity amidst the fuel types and temperatures. In some applications, the expected fuel specific gravity can vary by approximately 25% across expected temperature ranges and useable fuel types. The wide range in fuel density, if unknown, will drive a broad range in mass fuel flow for a given volumetric flow rate. This variability can lead to large variances in mass air to fuel flow ratios, making engine design across the environmental range inefficient, yielding oversized engines, conservative acceleration and/or deceleration schedules, excessive surge margins, and/or excessive blowout margins.

FIG. 1 is a cross-sectional diagram of an example of an ultrasonic flow measurement (USFM) system 100. The USFM system 100 includes a fluid housing 110 and two ultrasonic sensor modules 200. The fluid housing 110 includes an axial fluid housing cavity 120a defined by an interior surface 121a, and an axial fluid housing cavity 120b defined by an interior surface 121b. A fluid port 122a defines a fluid path 124a connected to the fluid cavity 120a. A fluid port 122b defines a fluid path 124b connected to the fluid cavity 120b. The fluid housing 110 also defines a cavity 126 that extends between the fluid cavity 120a and the 120b.

The fluid housing 110 also includes a fluid control conduit 130 that defines a fluid path 132 along a conduit axis 134. The fluid control conduit 130 fluidically connects the fluid cavity 120a and the fluid cavity 120b, putting the fluid cavity 120a in fluidic communication with the fluid cavity 120b. The fluid control conduit 130 has a predetermined flowable area 136 and shape (e.g., square, tapered, and/or curved edges, parallel or tapered walls, to affect fluid flow behavior). In some implementations, the fluid housing 110 can be used across many applications, and the fluid control conduit 130 can be an interchangeable, specialized subcomponent (e.g., an adapter) that can adapt the USFM system 100 for particular fluid types, applications, and/or operational conditions.

Figure 2A:
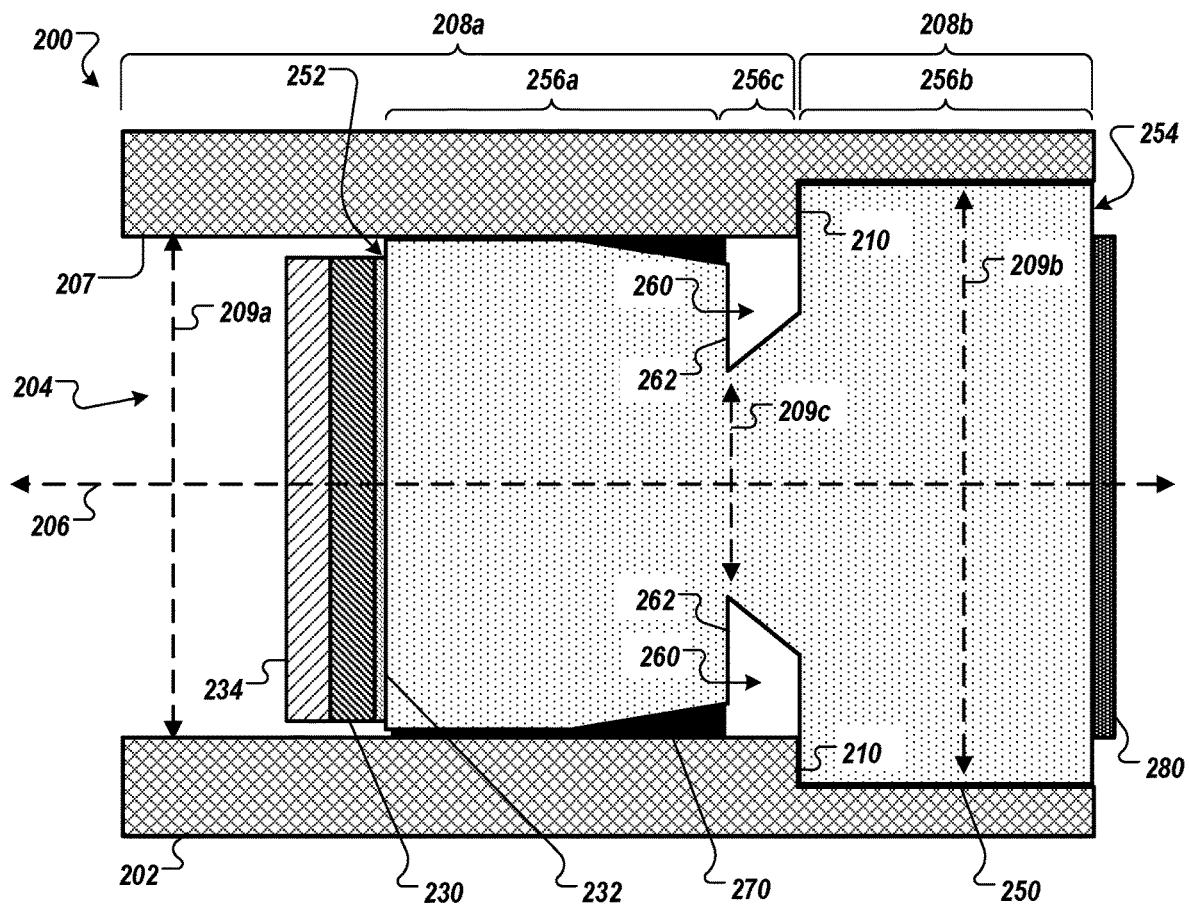
FIG. 2A is a cross-sectional diagram of an example ultrasonic sensor module of the system of FIG. 1.

Referring now to FIG. 2A, an enlarged cross-sectional diagram of the example ultrasonic sensor module 200 of the system of FIG. 1 is shown. The ultrasonic sensor module 200 includes a sensor housing 202 having an axial interior sensor housing cavity 204 and a sensor axis 206 defined by an interior surface 207. When the ultrasonic sensor module 200 is assembled to the fluid housing 110 of FIG. 1, the sensor axis 206 is substantially aligned with the conduit axis 134. The sensor housing 202 has an axial sensor housing portion 208a having a cross-sectional area 209a perpendicular to the sensor axis 206. The sensor housing 202 also has an axial sensor housing portion 208b having a cross-sectional area 209b perpendicular to the sensor axis 206. The cross-sectional area 209b is dimensionally larger than the cross-sectional area 209a, A face 210 extends from the interior surface 207 of the axial sensor housing portion 208a to the interior surface 108 of the axial sensor housing portion 208b. In the illustrated example, the face 210 is formed as a substantially squared shoulder or ledge at the transition between the cross-sectional area 209a and the cross-sectional area 209b. In some embodiments, the face 210 can be a tapered or otherwise non-squared transition between the cross-sectional area 209a and the cross-sectional area 209b.

The ultrasonic sensor module 200 also includes an acoustic transceiver element 230. The acoustic transceiver element 230 is configured to emit acoustic vibrations (e.g., ultrasonic sounds waves) at a predetermined wavelength (λ) when energized. In some embodiments, a separate acoustic driver and acoustic receiver may be implemented as the acoustic transceiver element 230. In some embodiments, the acoustic transceiver element 230 can be configured to also detect received acoustic vibrations. In some embodiments, the acoustic transceiver element 230 can be a piezo element.

The acoustic transceiver element 230 is acoustically mated with or otherwise abutted to an axial end 252 of a buffer rod 250 by a bonding layer 232. In some embodiments, the bonding layer 232 can be an adhesive layer. In some embodiments, the buffer rod can be made of any appropriate material or combination of materials that can provide proper acoustic impedance ratios when combined with matching layer material to improve or maximize sensitivity of measurements, are cost effective, can be fabricated within reasonable manufacturing tolerances, and/or provide good mechanical and chemical compatibility in the intended application environment. Examples of buffer rod materials include titanium alloys, austenitic stainless steel, aluminum, borosilicate glasses, fused (e.g., non-crystalline) quartz, and technical ceramics (e.g., AlN, $Al_3O_3$, SiN, and blends).

In some embodiments, the bonding layer 232 can be omitted, with the acoustic transceiver element 230 in direct contact with the axial end 252. For example, the acoustic transceiver element 230 can be held in place by a mechanical clamp or other appropriate fixation assembly, or the acoustic transceiver element 230 can be held in place by fixation features formed in the interior surface 207. In some embodiments, the bonding layer 232 can be formed from a highly ductile material, such as gold or lead, which can be conformed to the mating faces of the acoustic transceiver element 230 and the axial end 252.

The acoustic transceiver element 230 is backed by a backing 234. The backing 234 has a predetermined form and is made of a material that improves the sensitivity and/or efficiency of the acoustic transceiver element 230.

The buffer rod 250 extends along the sensor axis 206 from the axial end 252 to an axial end 254 opposite the axial end 252. The buffer rod 250 has a predetermined axial length of about a round multiple of one-half of the transmission wavelength of the acoustic transceiver element 230 (n/2λ). The buffer rod 250 includes an axial buffer portion 256a arranged within the axial sensor housing portion 208a and includes the axial end 252. The buffer rod 250 includes an axial buffer portion 256b arranged within the axial sensor housing portion 208b and includes the axial end 254. In some embodiments, the axial buffer portion 256b can contact the interior surface directly or indirectly (e.g., through a seal, sleeve, or bonding material) to substantially seal the sensor cavity 204 from fluid incursion at the axial end 254.

Figure 2B:
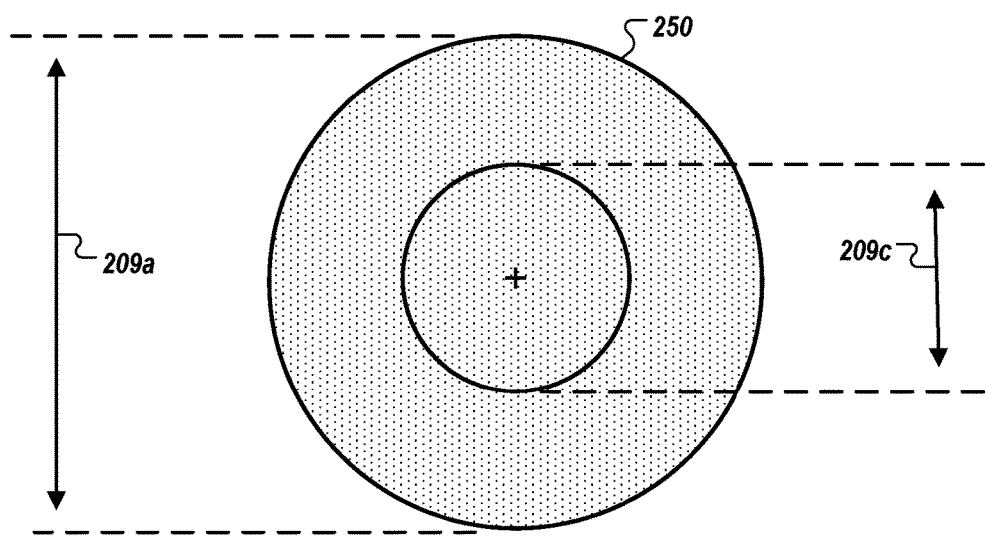
FIG. 2B shows a conceptual example of reflective surface areas in the example ultrasonic sensor module of FIG. 2A.

The buffer rod 250 also includes an axial buffer portion 256c that extends axially between the axial buffer portion 256a and the axial buffer portion 256b. The axial buffer portion 256c has a cross-sectional area 209c that is smaller than the cross-sectional area 209a perpendicular to the sensor axis 206. A cavity 260 is defined between the interior surface 207 and the axial buffer portion 256c. The cavity 260 is partly defined by a face 262 defined between the axial buffer portion 256a and the axial buffer portion 256c. The face 262 is a predetermined distance from the axial end 252. Referring to FIG. 2B, the cross-sectional area 209a is about twice as large as the cross-sectional area 209c. In other words, the area within axial buffer portion 256c is about the same as the area of the face 262.

The buffer rod 250 has a predetermined acoustic impedance ($Z_{buffer}$). In the illustrated example, the cavity 260 is filled with air (e.g., an air gap), a fluid (e.g., oil), or a solid having an acoustic impedance that is sufficiently different from the acoustic impedance of the buffer rod 250 to reflect an acoustic echo when struck by an acoustic wave (e.g., an ultrasonic ping). In some embodiments, the cavity 260 is evacuated to form at least a partial vacuum.

In the illustrated example, the axial buffer portion 256a is partly tapered, and is covered by a cladding 270. The taper has a predetermined shape that is configured to improve the efficiency and/or sensitivity of the ultrasonic sensor module 200 by directing the propagation of incident waves. The cladding 270 is configured to improve the efficiency and/or sensitivity of the ultrasonic sensor module 200 by directing the propagation of incident waves, acoustically isolating the buffer rod 250 from the sensor housing 202, and/or thermally insulating the buffer rod 250 from the sensor housing 202. In some embodiments, the taper, the cladding, or both may be omitted. In some embodiments, other portions of the buffer rod 250 may include a cladding.

Referring again to FIG. 2A, the ultrasonic sensor module 200 includes a matching layer 280 acoustically mated with, affixed to, or otherwise abutted to the axial end 252 of the buffer rod 250. In some embodiments, the matching layer 280 may be adhered to the axial end 252. In some embodiments, portions of the matching layer 280 may extend to the sensor housing 202 and be affixed (e.g., welded) to the sensor housing 202. In some embodiments in which the matching layer 280 is affixed to the sensor housing 202, the joint between the matching layer 280 and the sensor housing 202 can substantially seal the sensor cavity 204 from fluid incursion at the axial end 254. The matching layer 280 has an axial thickness that is about a round odd multiple of the transmission wavelength of the acoustic transceiver element 230 (n/4λ), for example 1/4λ.

Referring again to FIG. 1, the two ultrasonic sensor modules 200 face each other across the fluid control conduit 130. The acoustic transducer elements of the ultrasonic sensor modules 200 are separated by a predetermined distance 150.

The USFM system 100 includes a controller 190. The controller 190 includes circuitry configured to activate the ultrasonic sensor modules 200 to cause acoustic incident waves to be emitted, to detect the reception of acoustic waves at the ultrasonic sensor modules 200, measure the timings between transmission and reception of various combinations of direct and reflected acoustic waves, and/or determine various properties of the USFM system 100 and/or the fluid based in part on those measured timings as will be discussed further in the descriptions of FIGS. 3-9.

In use, a fluid is flowed through the USFM system 100. For example, a fluid such as fuel can be provided at the fluid port 122a where it will flow along the fluid path 124a into the fluid cavity 120a. The fluid flows around the ultrasonic sensor module 200 to the fluid control conduit 130. The fluid flows through the fluid control conduit 130 along the fluid path 132 and then flows around the ultrasonic sensor module 200 to the fluid cavity 120b. The fluid then flows along the fluid path 124b out the fluid port 122b. As will be discussed further in the descriptions of FIGS. 3-9, the ultrasonic sensor modules 200 are protected from direct exposure to the fluid, and are used to transmit acoustic waves through the fluid to determine properties of the fluid, such as acoustic impedance and mass flow.

Figure 3:
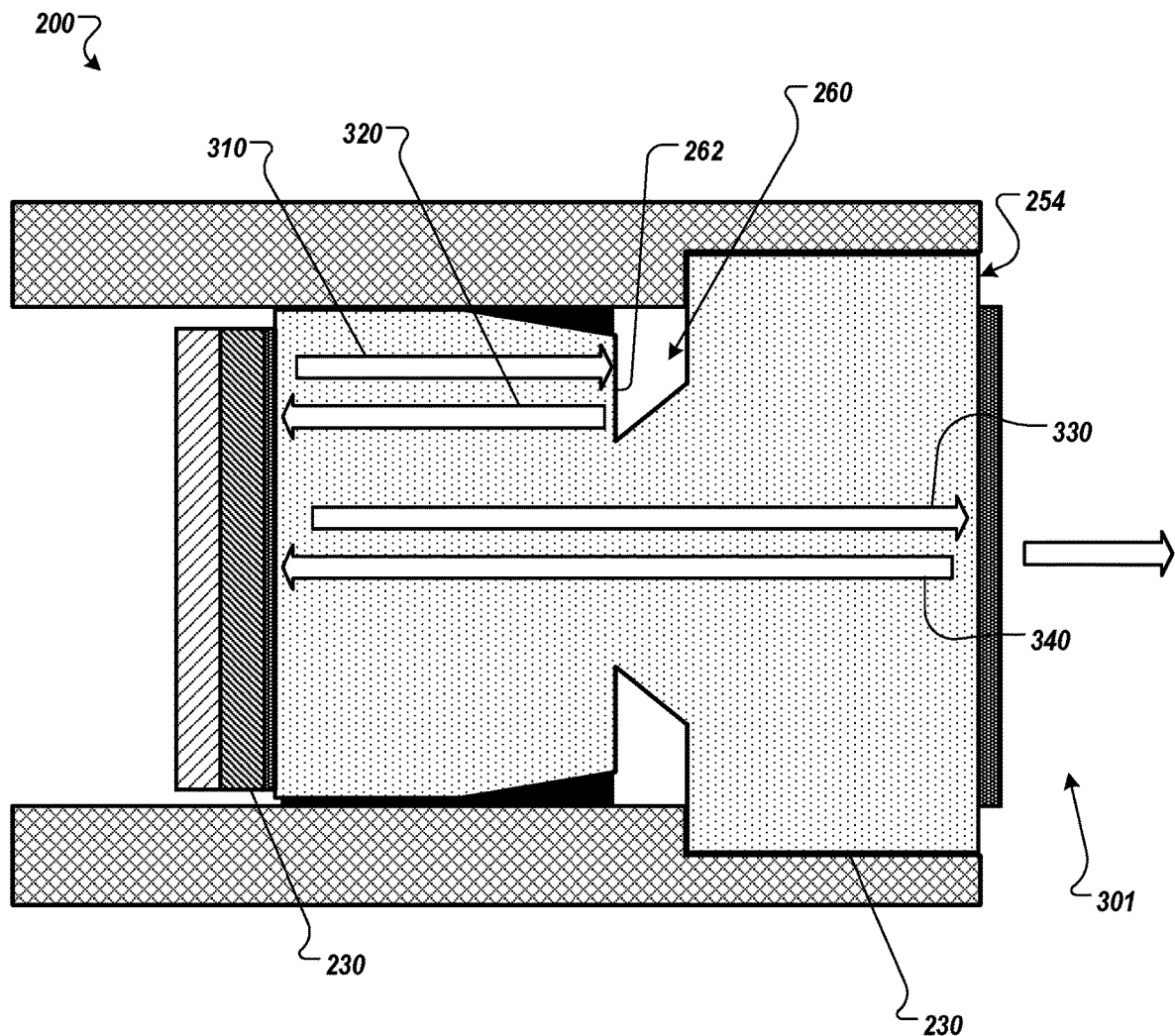
FIG. 3 shows a conceptual example of incident wave propagation in the module of FIG. 2A.

FIG. 3 shows a conceptual example of incident wave propagation in the ultrasonic sensor module 200 of FIG. 2A. In use, the acoustic transceiver element 230 is activated to emit an incident wave (e.g., a ping). The incident wave is transmitted into and along the buffer rod 250. A portion of the incident wave, represented by arrow 310, travels until it encounters the face 262. The junction of the face 262 and the cavity 260 causes a portion of the incident wave 310 to be reflected as an echo represented by arrow 320. The echo 320 travels back to be detected by the acoustic transceiver element 230. In some embodiments, the ultrasonic sensor module 200 may include a separate acoustic emitter and receiver for transmission and detection of the incident waves.

Another portion of the incident wave, represented by arrow 330, travels until it encounters the axial end 254. The junction of the axial end and a fluid 301 at the axial end 254 causes a portion of the incident wave 330 to be reflected as an echo represented by arrow 340. The echo 340 travels back to be detected by the acoustic transceiver element 230. Another portion of the incident wave, represented by arrow 350, propagates into the fluid 301 at the axial end 254.

The time between the transmission of the incident wave and detection of the echo 320 is measured (e.g., by the example controller 190 of FIG. 1) to determine a first time of flight. The time between the transmission of the incident wave and detection of the echo 340 is measured to determine a second time of flight. The amplitudes of the echo 320 and the echo 340 are also measured. As will be discussed further in the descriptions of FIGS. 6A-7, the measured times-of-flight, the measured echo amplitudes, and predetermined information about the acoustic impedance of the buffer rod 250 and predetermined distances between the acoustic transceiver element 230, the face 262, and the axial end 254, can be used to determine properties of the fluid 301 at the axial end 254, such as acoustic impedance ($Z_{fluid}$) and/or speed of sound in the fluid ($C_{fluid}$).

In some implementations, the ultrasonic sensor module 200 can be used in applications other than the USFM system 100. For example, the ultrasonic sensor module 200 can be put into contact with a fluid (e.g., attached to or submerged in a tank, pipe, or other fluid vessel or volume) and can be sonified as part of a process to determine an acoustic impedance of the fluid, a speed of sound in the fluid, and/or a fluid density of the fluid.

In some implementations, characteristics of the buffer rod 250 itself can be determined based on the measured times-of-flight and/or the measured echo amplitudes (e.g., to calibrate for unknown buffer rod acoustic impedance and/or compensate for the effects of temperature changes on the ultrasonic sensor module 200). Similarly, in some implementations, the distances between the acoustic transceiver element 230 and one or both of the face 262 and/or the axial end 254 can be determined based on the measured times of flight, the measured echo amplitudes, known distances, known buffer rod acoustic impedance, and/or known buffer rod temperature.

Figure 4:
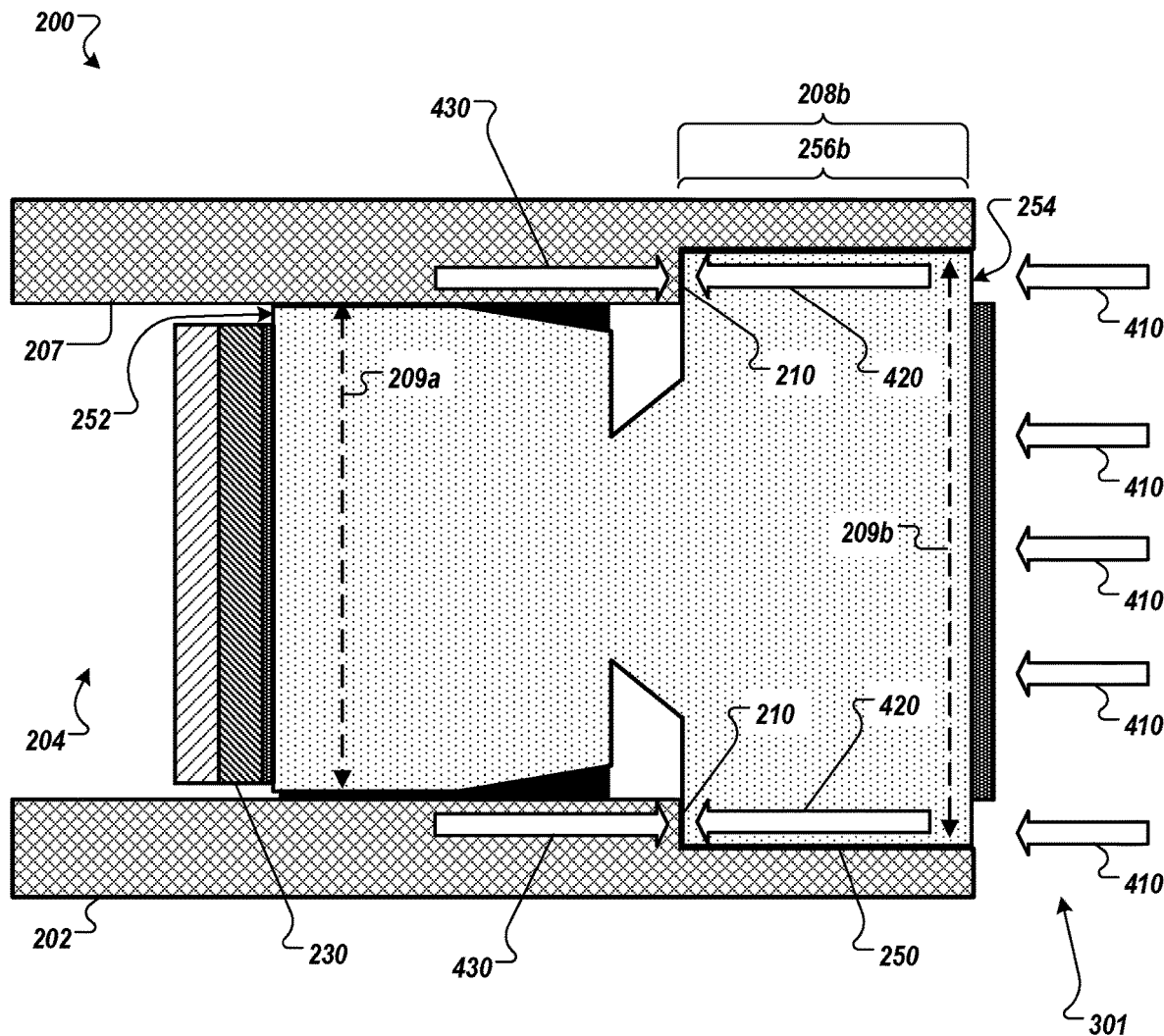
FIG. 4 shows a conceptual example of fluid pressure mitigation in the module of FIG. 2A.

FIG. 4 shows a conceptual example of fluid pressure mitigation in the ultrasonic sensor module 200 of FIG. 2A. In use, the ultrasonic sensor module 200 is at least partly exposed to the fluid 301 at the axial end 254. In some embodiments, the temperature or chemical properties of the fluid 301 can be damaging to the acoustic transceiver element 230, therefore the ultrasonic sensor module 200 is configured to prevent the fluid 301 from coming into direct contact with the acoustic transceiver element 230. For example, direct or indirect (e.g., though a shim, sleeve, cladding, seal, or sealant) contact between the axial buffer portion 256b and the axial sensor housing portion 208b and/or between the buffer rod 250 and the face 210 can substantially block fluid flow from the axial end 254 to the acoustic transceiver element 230. In some implementations, fluid seepage that gets by the buffer rod 250 can be directed to the sensor cavity 204 without contacting a major face of the acoustic transceiver element 230.

In use, the ultrasonic sensor module 200 is at least partly exposed to fluid pressure, represented by arrows 410, at the axial end 254. The fluid pressure 410 is a static fluid pressure relative to the dynamic pressures caused by the acoustic signals used by the acoustic transceiver element 230. In some embodiments, direct or indirect (e.g., through the buffer rod 250) application of the fluid pressure 410 could create a compressive force against the acoustic transceiver element 230 that could offset or otherwise negatively affect signals provided by the acoustic transceiver element 230 in response to sensed acoustic signals. In some implementations, such effects can be compensated for by mathematically by electrically offsetting the sensor signals in order to recover an approximation of the true signal.

The ultrasonic sensor module 200 is configured to prevent the fluid pressure 410 from affecting the acoustic transceiver element 230. For example, the acoustic transceiver element 230 is acoustically mated to the axial end 252. As such, the acoustic transceiver element 230 is able to "float" on the buffer rod 250 relative to the sensor housing 202 and not become compressed by the fluid pressure 410.

The acoustic transceiver element 230 is also protected from the fluid pressure 410 by the mechanical configuration of the buffer rod 250 and the sensor housing 202. Fluid pressure 410 is applied to the axial end 254, which urges movement of the buffer rod 250 into the sensor cavity 204. This pressure that urges such movement is represented by arrows 420. Movement of the buffer rod 250 is prevented by contact between the axial buffer portion 256b and the face 210 of the sensor housing 202, as represented by arrows 430. As such, the force 420 is prevented from reaching the acoustic transceiver element 230.

The smaller size of the cross-sectional area 209a is sized to accommodate acoustic transceiver element 230 and decouple thermal expansion of the sensor housing 202 from the acoustic path. The larger size of the cross-sectional area 209b is sized to accommodate the pressure induced forces acting on the buffer rod 250. The transmission of forces into the sensor housing 202 substantially eliminates pressure induced forces from acting on the acoustic transceiver element 230, substantially eliminating the need for pressure compensation, transducer components that are sized to react pressure induced forces, and/or wetted transducer design constraints.

By decoupling the acoustic transceiver element 230 from the fluid pressure environment, several advantages are observed. For example, fluid/fuel compatibility of the acoustic transceiver element 230 is not required. In another example, the acoustic transceiver element 230 frequency is not restricted by thickness requirements driven by pressure induced forces. In another example in which the acoustic transceiver element 230 is a piezo transducer, the piezo thickness required to support fluid pressure puts the operating frequency of the acoustic transceiver element 230 far below operating requirements of time of flight measurement. In yet another example, the operational frequency of the acoustic transceiver element 230 can be sized to improve acoustic optimization and/or low flow measurement accuracy.

Figure 5A:
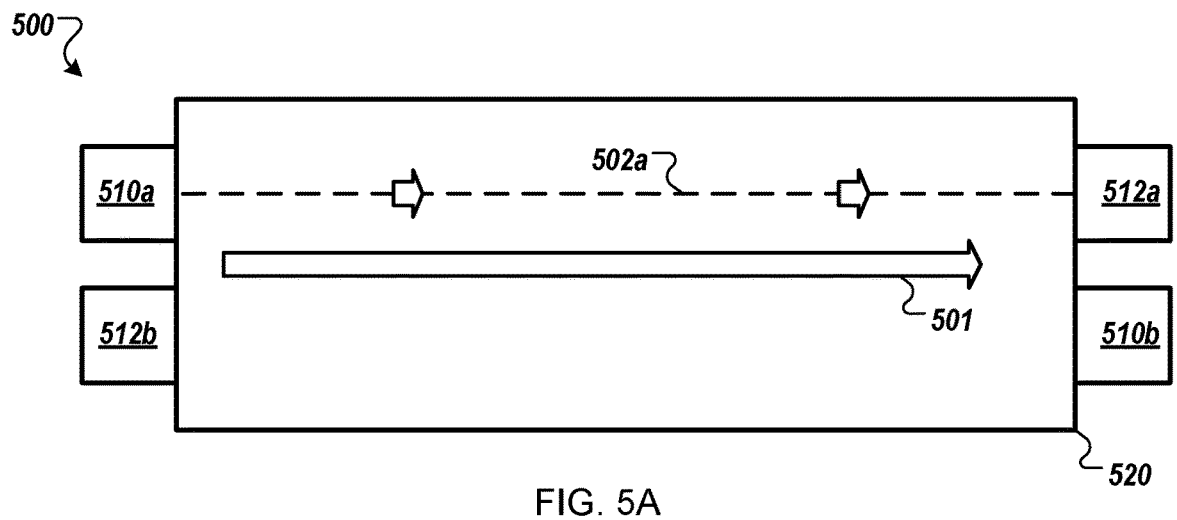
FIGS. 5A-5C show conceptual examples of incident wave traversal in an ultrasonic flow measurement system.
Figure 5B:
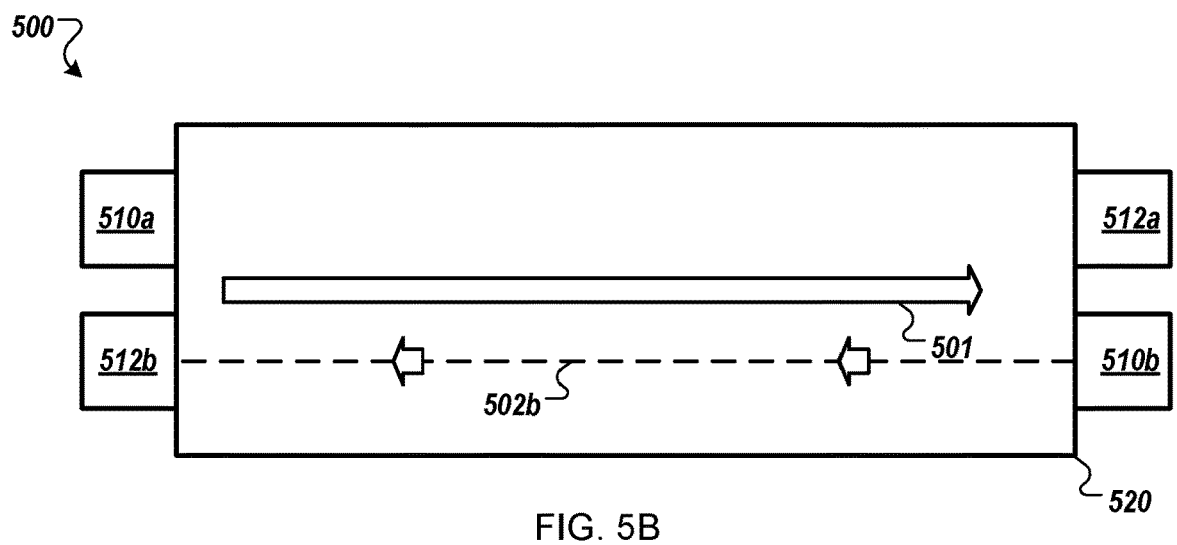
Figure 5C:
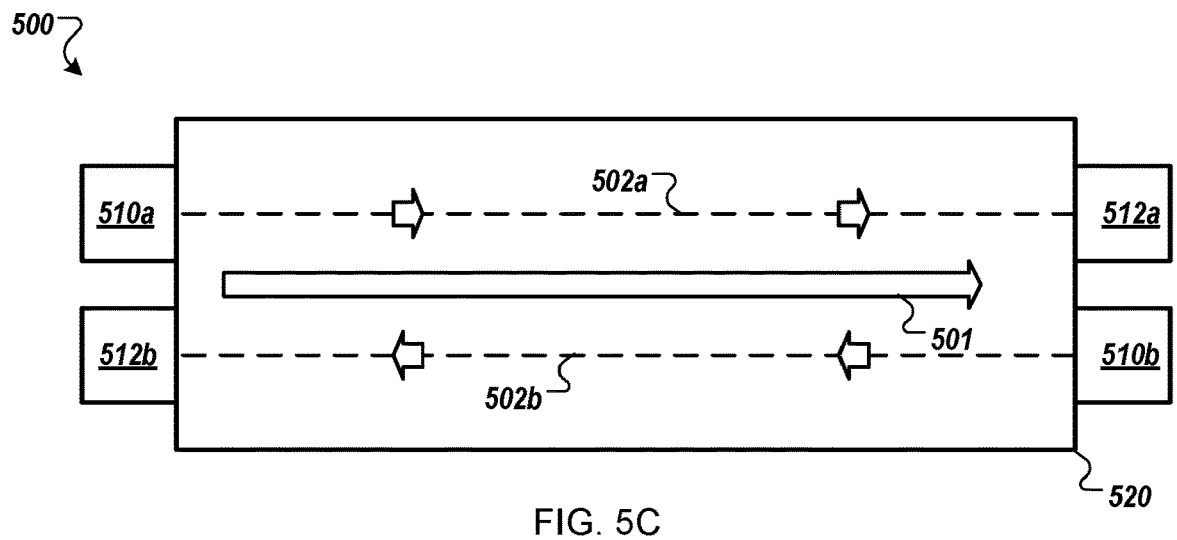

FIGS. 5A-5C show conceptual examples of incident wave traversal in an ultrasonic flow measurement system 500. In some implementations, the USFM system 500 can be an example of the USFM system 100 of FIG. 1. The USFM system 500 includes two acoustic emitters 510a and 510b, two acoustic receivers 512a and -512b, and a fluid control conduit 520. A fluid flows along the fluid control conduit 520 in a direction represented by arrow 501.

The derivation that follows assumes that the acoustic receivers 512a and 512b are aligned with their respective acoustic emitters 510a and 510b, perpendicular to the major axis of the fluid control conduit 520. Therefore, the below derivation omits angles of incidence. If the acoustic emitters 510a, 510b and acoustic receivers 512a, 512b were placed off axis, the following derivation could be re-derived using an angle of incidence. However, for simplicity, the trigonometry used to compensate for such angles is not used here.

Referring to FIG. 5A, first, the speed of sound traveling through a non-moving fluid is considered:

Distance = Velocity × time

Or:

Length $(L)$ = Speed of sound in fluid $(C_{fluid})$ × time $(t)$ $$\therefore L_1 = C_{fluid} \times t_1$$

$$t_1 = \frac{L_1}{C_{fluid}}$$

Where Cfuel is the speed of sound in fluid, $L_1$ is the distance between the acoustic transmitter 510a and the acoustic receiver 512a, and $t_1$ is the signal transit time between the acoustic transmitter 510a and the acoustic receiver 512a.

Assuming that the direction 501 in which the control volume (fluid) is moving is the same as a direction of sound travel, represented by line 502a from the acoustic transmitter 510a to the acoustic receiver 512a, the speed of the sound wave traveling through the fluid will change relative to the speed of the fluid.

$$\therefore L_2 = V_2 \times t_2$$

$$V_2 = V_{fluid} + C_{fluid}$$

$$\therefore L_2 = (V_{fluid} + C_{fluid})t_2$$

$$t_2 = \frac{L_2}{(C_{fluid} + V_{fluid})}$$

Where $V_{fluid}$ is the average velocity of moving fluid, $L_2$ is the distance between the acoustic transmitter 510a and the acoustic receiver 512a, and $t_2$ is the signal transit time between the acoustic transmitter 510a and the acoustic receiver 512a.

Referring now to FIG. 5B, it is assumed that the control volume (fluid) is opposing the direction of the sound travel from the acoustic emitter 510b to the acoustic receiver 512b, represented by line 502b. The speed of the sound wave traveling through the fluid will change relative to the speed of the fluid.

$$\therefore L_3 = V_3 \times t_3$$

$$V_3 = -V_{fluid} + C_{fluid}$$

$$\therefore L_3 = (-V_{fluid} + C_{dluid})t_3$$

$$t_3 = \frac{L_3}{(c_{fluid} - V_{fluid})}$$

Where $L_3$ is the distance between the acoustic emitter 510b and the acoustic receiver 512b, and $t_3$ is the signal transit time between the acoustic emitter 510b and the acoustic receiver 512b.

Referring for FIG. 5C, for a particular set of ultrasonic sensors, the devices can both emit and receive signals. This means that for a pair of signals, the following characteristics are shared:

$L_{up} = L_{down} = L$ = distance between emitters;
D = diameter ∴ Area of the fluid control conduit 520;
A = cross section area;
$C_{fluid}$ = speed of sound in fluid;
$V_{fluid}$ = velocity of fluid;
$\rho_{fluid}$ = density of fluid;
$Z_{fluid}$ = Acoustic impedance of fluid.

With the above properties shared, the difference in time between the upstream and downstream signal will allow calculation of various fluid characteristics.

Upstream and downstream transit times become:

$$t_{up} = \frac{L_{up}}{(C_{fluid} - V_{fluid})}$$

$$t_{down} = \frac{L_{down}}{(C_{fluid} + V_{fluid})}$$

Solving for $t_{up}$, $t_{down}$, and $C_{fluid}$:

$$C_{fluid} = \frac{(L_{down} - t_{down}V_{fluid})}{t_{down}}$$

$$C_{fluid} = \frac{(L_{up} + t_{up}V_{fluid})}{t_{up}}$$

Since speed of sound is common between the transducers, the speeds of sound are equal to one another and allows fluid velocity to be found:

$$C_{fluid} = C_{fluid}$$

$$\frac{(L_{down} - t_{down}V_{fluid})}{t_{down}} = \frac{(L_{up} + t_{up}V_{fluid})}{t_{up}}$$

$$L_{down}t_{up} - t_{down}t_{up}V_{fluid} = L_{up}t_{down} + t_{up}t_{down}V_{fluid}$$

$$L_{down}t_{up} - L_{up}t_{down} = t_{up}t_{down}V_{fluid} + t_{down}t_{up}V_{fluid}$$

$$L_{up} = L_{down}$$

$$L(t_{up} - t_{dn}) = 2V_{fluid}t_{up}t_{down}$$

$$V_{fluid} = \frac{L(t_{up} - t_{down})}{2t_{up}t_{down}}$$

Knowing the velocity of the fluid allows the volume fluid flow ($Q_{fluid}$) to be determined, where $C_d$ is a predetermined discharge coefficient of the fluid in the fluid control conduit 520:

$Q_{fluid} = C_d \times A \times V_{fluid}$

Fluid sound speed properties can also be determined. Since the fluid velocity is shared between the pair of transducers the fluid velocity can be solved for. Recalling that:

$$t_{up} = \frac{L_{up}}{(C_{fluid} - V_{fluid})}$$

And:

$$t_{down} = \frac{L_{down}}{(C_{fluid} + V_{fluid})}$$

Solving $t_{up}$ and $t_{down}$ for $V_{fluid}$:

$$V_{fluid} = (L_{down} - t_{down}C_{fluid})/t_{down}$$

$$V_{fluid} = (-L_{up} + t_{up}C_{fluid})/t_{up}$$

Since velocity of the fluid is common between the transducers, the previous two equations equal one another and allow fluid sound speed to be solved:

$$V_{fluid} = V_{fluid}$$

$$\frac{(L_{down} - t_{down}C_{fluid})}{t_{down}} = \frac{(-L_{up} + t_{up}C_{fluid})}{t_{up}}$$

$$L_{down}t_{up} - t_{down}t_{up}C_{fluid} = -L_{up}t_{down} + t_{up}t_{down}C_{fluid}$$

$$L_{down}t_{up} + L_{up}t_{down} = t_{up}t_{down}C_{fluid} + t_{down}t_{up}C_{fluid}$$

$$L_{up} = L_{down}$$

$$L(t_{up} - t_{dn}) = 2C_{fluid}t_{up}t_{down}$$

$$C_{fluid} = \frac{L(t_{up} + t_{down})}{2t_{up}t_{down}}$$

Figure 6A:
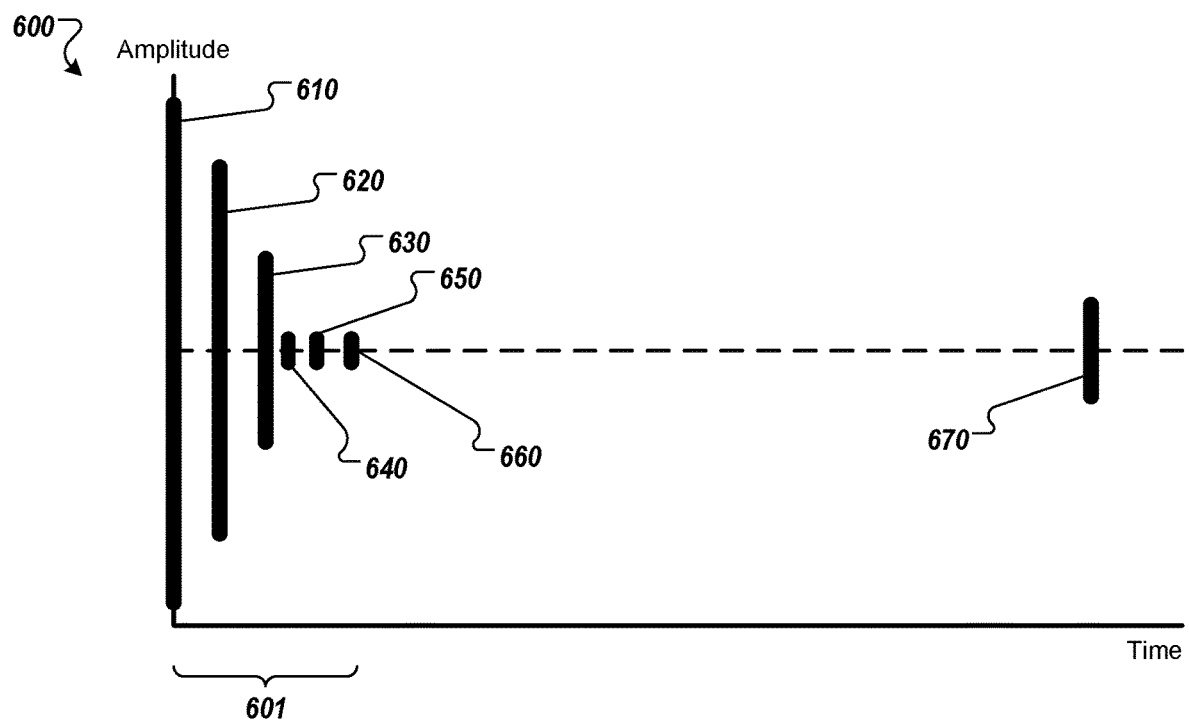
FIGS. 6A and 6B are graphs that show example incident waves and echoes in the ultrasonic flow measurement system of FIG. 1.
Figure 6B:
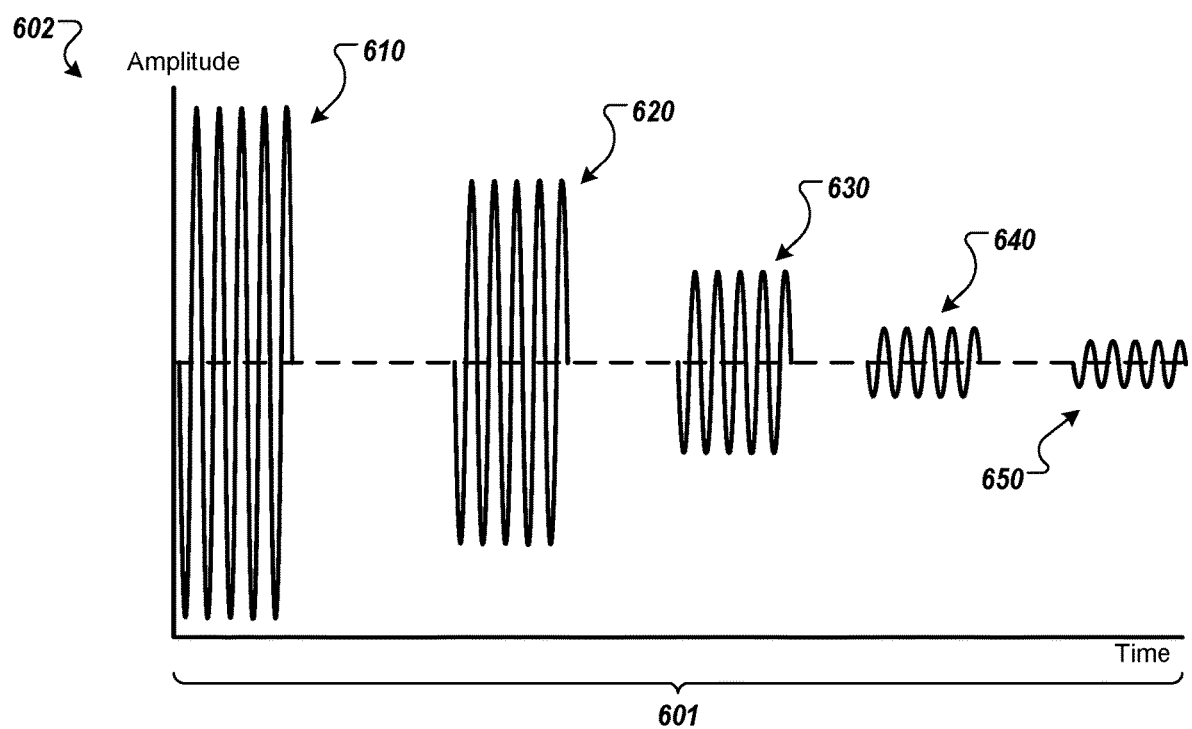

FIGS. 6A and 6B are graphs that show example incident waves and echoes in the ultrasonic flow measurement system of FIG. 1. FIG. 6A shows a graph 600 of acoustic amplitude over time, including a sub-duration 601. FIG. 6B shows a graph 602 in which the sub-duration 601 has been expanded for visibility.

The graph 600 shows a representation of the emission of an initial incident wave 610 (e.g., when the acoustic transceiver element 230 is activated to send an acoustic "ping"). An echo 620 is received a few milliseconds later. In some implementations, the echo 620 can be the echo 320 of FIG. 3, which is a reflection of a portion of the incident wave 310 off the face 262 of the cavity 260.

An echo 630 is received a few milliseconds later. In some implementations, the echo 630 can be the echo 340, which is a reflection of a portion of the incident wave 330 off the axial end 254, which is also an interface to the fluid. Echoes 640, 650, and 660 represent reverberations in the buffer rod 250. In operation, the echoes 640-660 can be filtered out or otherwise ignored.

An incident wave 670 represents a portion of the incident wave that is received by an acoustic sensor (e.g., the acoustic transceiver element 230 located downstream or otherwise opposite the acoustic transceiver element 230 that transmitted the incident wave). The amount of time taken by the incident wave 670 to arrive is affected by several variables, such as the fluid density, flow rate, and flow direction of the fluid in the fluid control conduit 130, and the distance 150. The amount of time taken for the incident wave 670 can be used as $t_{up}$ or $t_{down}$ (e.g., depending on whether the wave traveled upstream or downstream in the fluid control conduit 130).

As illustrated in FIG. 4, the buffer rod 250 is designed to transfer pressure induced forces to the face 210 of the sensor housing 202. This is achieved through the double diameter construction of the buffer rod 250, where the smaller cross-sectional area is sized to accommodate the acoustic transceiver element 230 and decouple thermal expansion of the sensor housing 202 from the acoustic path. The larger cross-sectional area of the axial buffer portion 256b is sized to accommodate the pressure induced forces acting on the buffer rod 250. The transmission of forces into the sensor housing 202 substantially eliminates pressure induced forces from acting on the acoustic transceiver element 230 and substantially eliminates the need for (e.g., piezo ceramic) pressure compensation, sizing to react the pressure induced forces, and substantially avoids wetted transducer design constraints.

By decoupling the acoustic transceiver element 230 from the fluid pressure environment, several advantages are observed. For example, fluid/fuel compatibility of the acoustic transceiver element 230 is not required, the acoustic transceiver element 230 frequency is not restricted by thickness requirements driven by pressure induced forces, the thickness of the acoustic transceiver element 230 required to support fluid pressure puts operating frequency far below operating requirements of time of flight measurement, and acoustic transducer frequency can be sized for acoustic optimization and low flow measurement accuracy.

For aircraft turbine fuel systems, mass fuel flow rate can be determined for an understanding of combustion energy content. This is solved through the use of the buffer rod 250. The internal design of the buffer rod 250 enables additional acoustic benefits which can be intentionally designed into the USFM system 100. For example, the configuration of the buffer rod 250 enables the controller 190 to determine reflection coefficients for fuel acoustic impedance measurement. This is achieved by introducing a transducer transmit amplitude response (e.g., echoes 320 or 620), achieved with the cavity 260 which acts as a substantially ideal reflector, and this amplitude can be compared to the return echoes of the buffer rod fluid interface (e.g., echoes 340 or 630). In some embodiments, the sensitivity of the axial end 254 is further enhanced by the matching layer 280, however, this will be ignored in order to simplify the equations below.

Fluid acoustic impedance can be determined by setting echo reflection effective areas equal to one another, for example by configuring the cross-sectional areas 209a and 209c appropriately. In some implementations, the areas can be non-equal, and a mathematical compensation can be integrated into the process. However, for the sake of clarity, the areas are assumed to be equal in the equations below. This allows for direct measurement of the reflection coefficient. The wave propagation within the buffer rod 250 is articulated such that in air, the echo returned from the face 262 is equivalent to the echo from the axial end 254.

The reflection coefficient is found through the use of short time Fourier transforms (STFT). The fast Fourier transforms (FFT) of the two echoes are found to determine the peak of the return echoes:

STFT→Amplitude=f (Frequency)

Therefore:

$|A|=|FFT(Echo_1)|_{f=f_0}$ $|B|=|FFT(Echo_2)|_{f=f_0}$

Where:

Echo$_1$ is one of the echoes 320 or 620 of FIGS. 3 and 6 respectively, Echo$_2$ is one of the echoes 340 or 630 of FIGS. 3 and 6 respectively, and f and f$_0$ are the transducer driving frequency. The reflection coefficient is then found from:

$$R = \frac{|A|}{|B|}$$

And, assuming the buffer rod 250 is in direct interface with the fluid or fuel (e.g., no matching layer 280 in this case):

$$R = \frac{Z_2 - Z_1}{Z_2 + Z_1}$$

Where R is the reflection coefficient.

$Z_2 = Z_{fluid}$ $Z_1 = Z_{buffer}$ $$Z_{fluid} = \frac{Z_{buffer}(1-R)}{1+R}$$

The impedance of the buffer rod 250 can be determined through characterization at the sensor level. With the buffer rod impedance known and the reflection coefficient being measured, the fluid impedance can now be solved for:

$Z_{fluid} = \rho_{fluid} C_{fluid}$

From the equations above, a speed of sound in fluid was solved for. Since fluid impedance and fluid sound speed are known, fluid density can now be solved for.

$$\rho_{fluid} = \frac{Z_{fluid}}{C_{fluid}}$$

Explicitly:

$$\rho_{fluid} = \frac{\left(\frac{Z_{buffer}(1-R)}{1+R}\right)}{\left(\frac{L(t_{up}+t_{down})}{2t_{up}t_{down}}\right)}$$

With volumetric fluid flow and density now known, the mass fluid flow rate can be found:

$$\dot{m}_{fluid} = Q_{fluid}\rho_{fluid} = C_d A V_{fluid} \frac{Z_{fluid}}{C_{fluid}}$$

Figure 7:
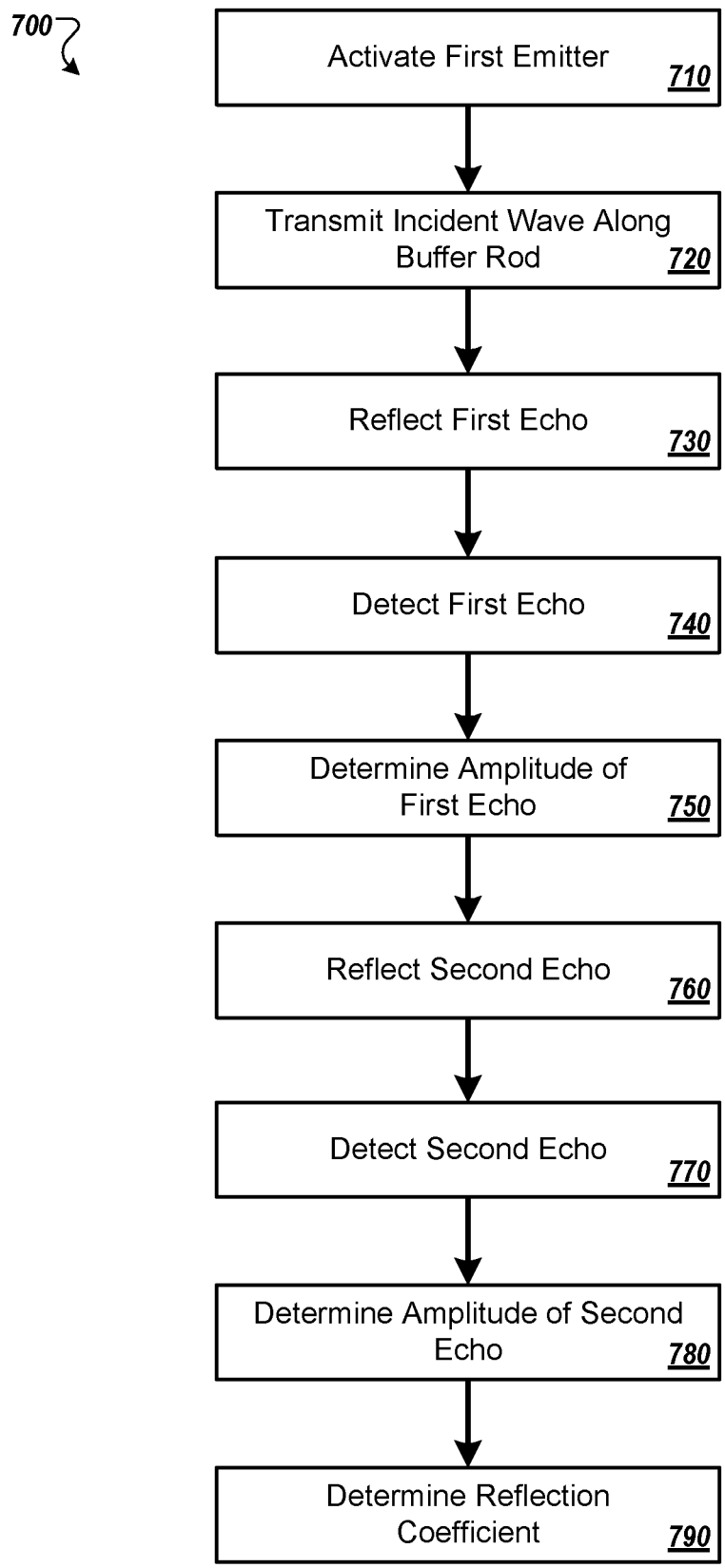
FIG. 7 is a flow chart that shows an example of a process for determining a fluid reflection coefficient.

FIG. 7 is a flow chart that shows an example of a process 700 for determining a fluid reflection coefficient. In some implementations, the process 700 can be used with the example ultrasonic sensor module 200 of FIGS. 1-2B.

At 710, a first emitter is activated to emit at least one incident wave. For example, the example acoustic transceiver element 230 can be activated to emit an indecent wave.

At 720 the incident wave is transmitted along a buffer rod having a first axial end abutted to the first emitter and a second axial end opposite the first axial end. For example, the incident wave can propagate through the buffer rod 250.

At 730 a first echo of the incident wave is reflected by a gap defined along a portion of the buffer rod. For example, the portion of the incident wave 310 can encounter the face 262 of the cavity 260 and be reflected as the echo 320.

At 740, the first echo is detected. For example, the echo 620 of FIGS. 6A and 6B can be detected.

At 750 a first amplitude of the first echo is determined. For example, a FFT can be performed on the echo 620 to determine an amplitude of the echo 620 (e.g., amplitude A as described above).

At 760 a second echo of the incident wave is reflected by the second axial end. For example, the portion of the incident wave 330 is reflected off the axial end 254 as the echo 340. In some implementations, the second echo can be reflected by a 1/4λ matching layer affixed to the second axial end, for example, the matching layer 280 at the axial end 254.

At 770, the second echo is detected. For example, the echo 630 of FIGS. 6A and 6B can be detected.

At 780, a second amplitude of the second echo is determined. For example, a FFT can be performed on the echo 640 to determine an amplitude of the echo 640 (e.g., amplitude B as described above).

At 790, a reflection coefficient based on the first amplitude and the second amplitude can be determined. For example:

$$R = \frac{|A|}{|B|}$$

Figure 8:
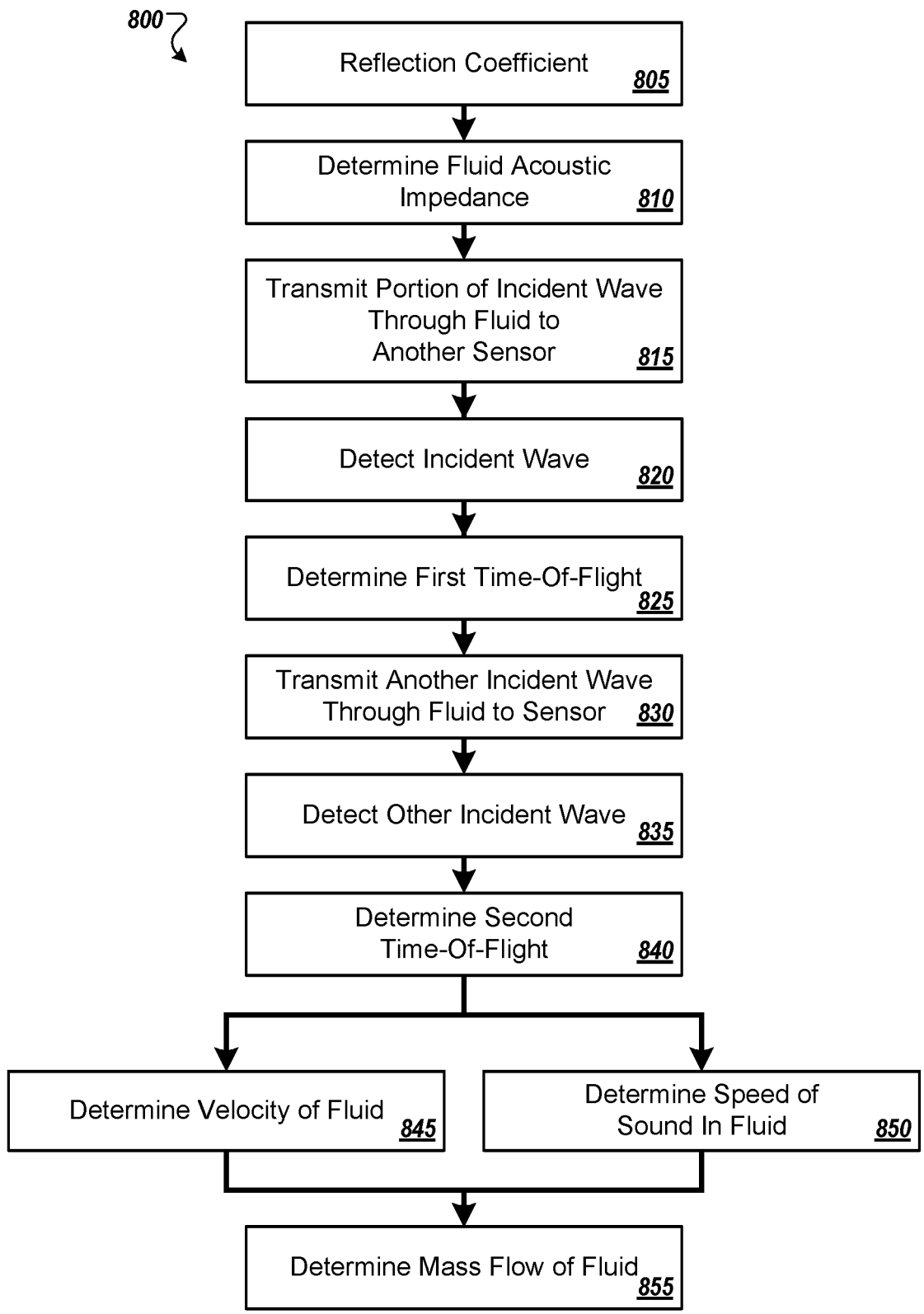
FIG. 8 is a flow chart that shows an example of a process for determining a mass fluid flow.

FIG. 8 is a flow chart that shows an example of a process 800 for determining a mass fluid flow. In some implementations, the process 800 can be used with the example USFM system 100 of FIG. 1.

At 805, a reflection coefficient value is received. For example, the reflection coefficient R determined at 790 can be received.

At 810, a fluid acoustic impedance of a fluid at the second axial end is determined based on the determined reflection coefficient and a predetermined buffer rod acoustic impedance. For example, the reflection coefficient R can be used along with the predetermined buffer rod impedance $Z_{buffer}$ to determine $Z_{fluid}$, as described above.

At 815, a portion of the incident wave is transmitted at the second axial end through the fluid to a sensor arranged a predetermined distance away from and opposite the first emitter, where the fluid is within a tubular fluid conduit having a predetermined cross-sectional area. For example, the incident wave 670 of FIG. 6 can travel through the fluid from the ultrasonic sensor module 200 that is upstream to the ultrasonic sensor module 200 that is downstream.

At 820, the second sensor detects the portion of the incident wave. For example, the ultrasonic sensor module 200 that is downstream can detect the incident wave 670.

At 825, a first time of flight of the portion of the incident wave is determined based on the detected portion of the incident wave. For example, $t_{down}$ can be determined.

At 830, another incident wave is transmitted, by a second emitter, through the fluid to the first sensor. For example, the ultrasonic sensor module 200 that is downstream can be activated to emit another indecent wave upstream.

At 835, the first sensor detects the other incident wave, and at 840 a second time of flight of the other incident wave is determined based on the detected other incident wave. For example, $t_{up}$ can be determined.

At 845, a velocity of the fluid within the tubular fluid conduit is determined. For example, $V_{fluid}$ can be determined as:

$$V_{fluid} = \frac{L(t_{up} - t_{down})}{2t_{up}t_{down}}$$

At 850, a speed of sound within the fluid is determined. For example, $C_{fluid}$ can be determined as:

$$C_{fluid} = \frac{L(t_{up} + t_{down})}{2t_{up}t_{down}}$$

At 855, a mass fluid flow rate is determined based on at least the predetermined cross-sectional area, the determined velocity of the fluid, the determined fluid acoustic impedance, and the determined speed of sound. For example:

$$\dot{m}_{fluid} = Q_{fluid}\rho_{fluid} = C_d A V_{fluid} \frac{Z_{fluid}}{C_{fluid}}$$

In some implementations, one or both of the first emitter and the first sensor can be piezo elements. In some implementations, the piezo element can include the first emitter and the first sensor. For example, the emitter and sensor can be separate components, or the acoustic transceiver element 230 can perform the emitting and detecting functions within the ultrasonic sensor module 200.

Figure 9:
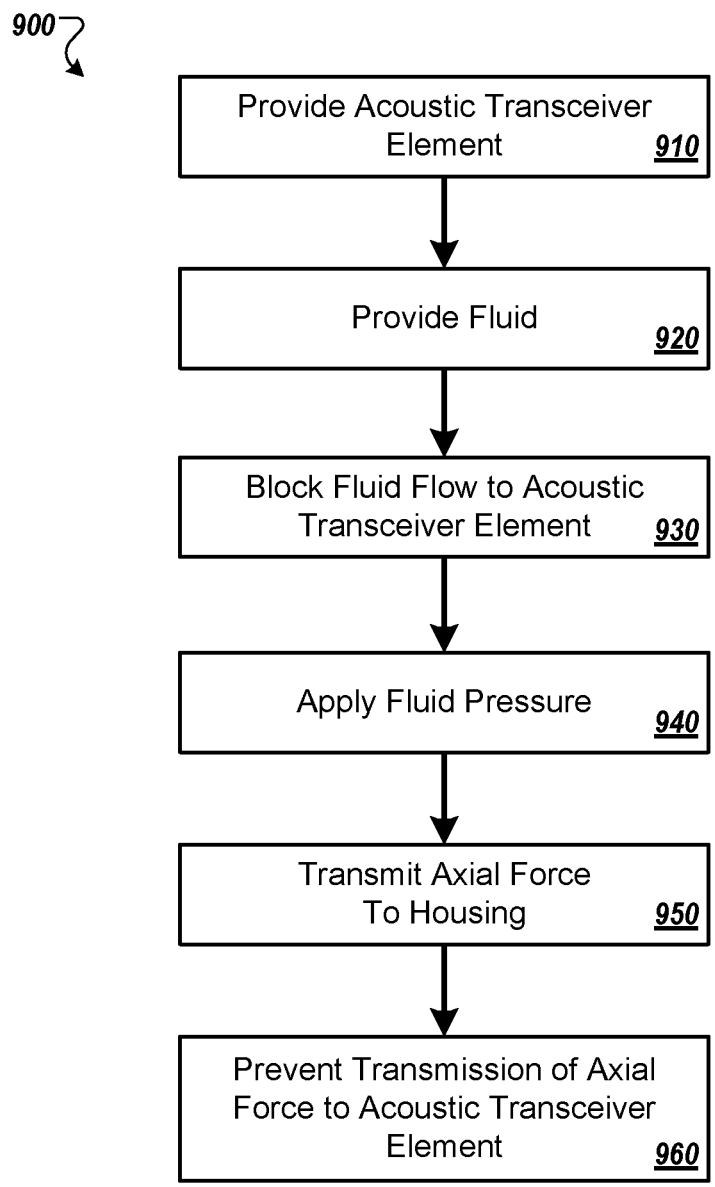
FIG. 9 is a flow chart that shows an example of a process for resisting effects of fluid exposure on the acoustic transducer of the module of FIG. 2A.

FIG. 9 is a flow chart that shows an example of a process 900 for resisting effects of fluid exposure on the acoustic transceiver element 230 of the example ultrasonic sensor module 200 of FIGS. 1-4. At 910, a sensor is provided. The sensor includes a sensor housing having an interior surface defining a sensor axis and an axial interior sensor housing cavity having a first axial sensor housing portion having a first cross-sectional area perpendicular to the sensor axis, a second axial sensor housing portion arranged adjacent to the first axial sensor housing portion along the sensor axis and having a second cross-sectional area larger than the first cross-sectional area perpendicular to the sensor axis, and a face extending from the interior surface of the first axial housing portion to the interior surface of the second housing portion, a buffer rod having a first axial end and a second axial end opposite the first axial end and having a first axial buffer portion arranged within the first housing portion and having the first axial end, a second axial buffer portion arranged within the second housing portion and abutting the face, and having the second axial end, and a third axial buffer portion, extending axially between the first axial buffer portion and the second axial buffer portion, and having a third cross-sectional area, smaller than the first cross-sectional area, perpendicular to the sensor axis, and an acoustic transceiver element acoustically mated to the first end. For example, the ultrasonic sensor module 200 can be provided.

At 920, a fluid is provided at the second axial end. For example, the fluid 301, such as a fuel, can be provided in the fluid cavity 120a or 120b so as to contact the axial end 254.

At 930, the buffer rod and the sensor housing blocks fluid flow from the second end to the acoustic transceiver element. For example, as discussed in the description of FIG. 4, the acoustic transceiver element 230 is separated from the fluid 301 by the sensor housing 202 and the buffer rod 250, and the fluid 301 by the sensor housing 202 and the buffer rod 250 are configured to prevent the fluid 301 from flowing to the acoustic transceiver element 230.

In some implementations, fluid flow from the second end to the acoustic transceiver element can be blocked by the sensor housing and the second axial buffer portion. For example, the fluid 301 is prevented from flowing to the acoustic transceiver element 230 by interference between the sensor housing 202 and the axial buffer portion 256b.

At 940, a fluid pressure is applied against the second axial end to produce an axial force against the buffer rod. For example, the fluid force 410 can be applied against the axial end 254.

At 950, the buffer rod transmits the axial force to the sensor housing. For example, the buffer rod 250 transmits the force 420 to the sensor housing 202.

At 960, the sensor housing prevents transmission of the axial force to the acoustic transceiver element. In some implementations, the process 900 can also include transmitting, by the second axial portion, the axial force to the face, wherein the face interferes with axial movement of the buffer rod toward the acoustic transceiver element. For example, any movement of the buffer rod 250 into the sensor cavity 204 is prevented by the counteractive force 430 created through contact between the axial buffer portion 256b and the face 210.

Figure 10:
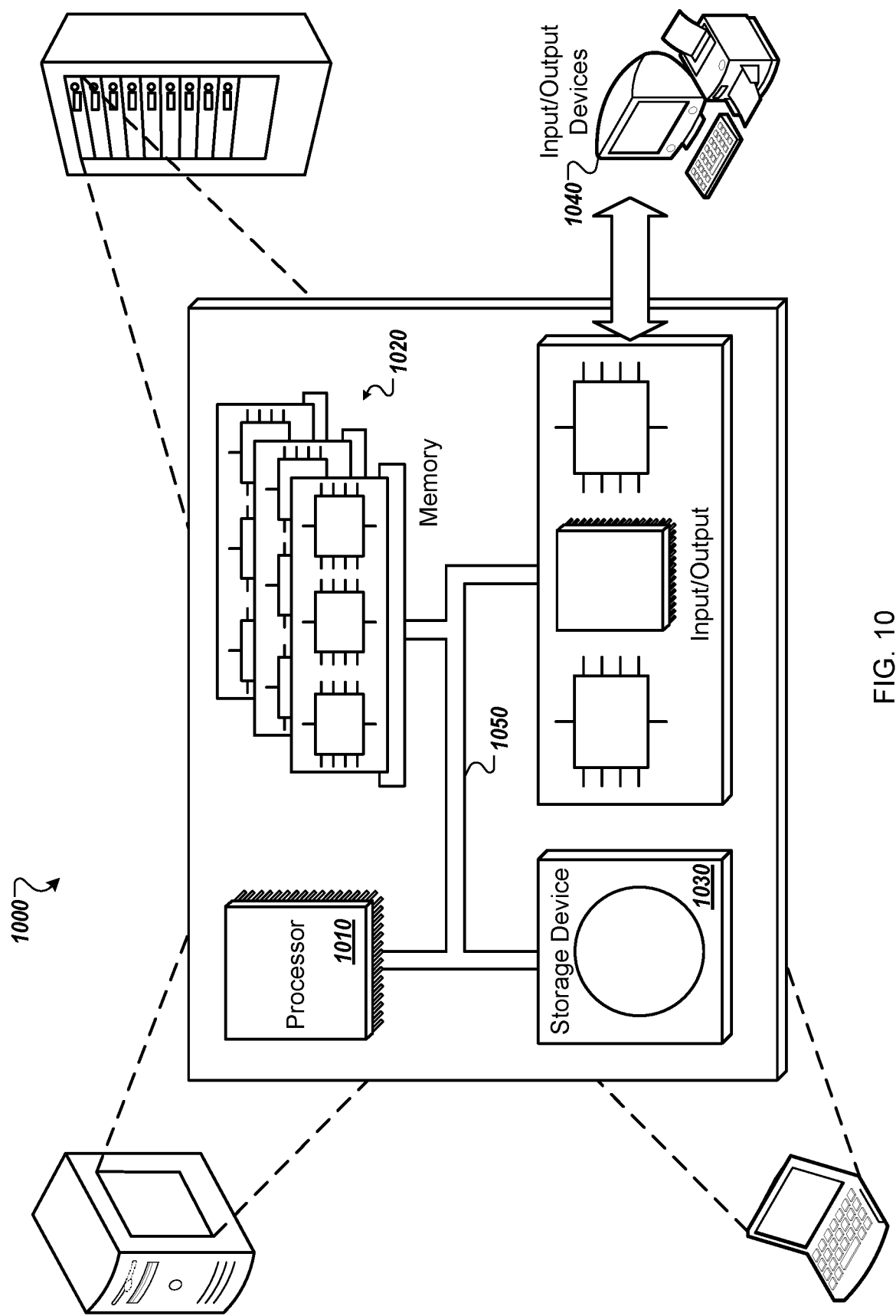
FIG. 10 is a schematic diagram of an example of a generic computer system

FIG. 10 is a schematic diagram of an example of a generic computer system 1000. The system 1000 can be used for the operations described in association with the process 700, 800, and/or 900 according to one implementation. For example, the system 1000 may be included in the controller 190.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A sensor comprising:
   a sensor housing having an interior surface defining a sensor axis and an axial interior sensor housing cavity comprising:
      a first axial sensor housing portion having a first cross-sectional area perpendicular to the sensor axis;
      a second axial sensor housing portion arranged adjacent to the first axial sensor housing portion along the sensor axis and having a second cross-sectional area larger than the first cross-sectional area perpendicular to the sensor axis; and
      a face extending from the interior surface of the first axial housing portion to the interior surface of the second axial housing portion;
   a buffer rod having a first axial end and a second axial end opposite the first axial end and comprising:
      a first axial buffer portion arranged within the first housing portion and comprising the first axial end;
      a second axial buffer portion arranged within the second housing portion and abutting the face, and comprising the second axial end; and
      a third axial buffer portion, extending axially between the first axial buffer portion and the second axial buffer portion, and having a third cross-sectional area, smaller than the first cross-sectional area, perpendicular to the sensor axis;
   a cavity defined between the interior surface and the third axial buffer portion; and
   an acoustic transceiver element acoustically mated to the first axial end.

2. The sensor of claim 1, wherein the acoustic transceiver element is configured to emit a vibration having a predetermined wavelength ($\lambda$), and the buffer rod has an axial length of about a round multiple of $n/2\lambda$.

3. The sensor of claim 1, wherein the third cross-sectional area is about half as large as the first cross-sectional area.

4. The sensor of claim 1, further comprising a tubular fluid conduit having a first conduit end and a second conduit end opposite the first conduit end and defining a conduit axis, arranged such that the conduit axis is substantially aligned with the sensor axis.

5. The sensor of claim 4, further comprising:
   another sensor housing having another interior surface defining another sensor axis and another axial interior sensor housing cavity comprising:
      another first axial sensor housing portion having another first cross-sectional area perpendicular to the other sensor axis;
      another second axial sensor housing portion arranged adjacent to the other first axial sensor housing portion along the other sensor axis and having another second cross-sectional area larger than the other first cross-sectional area perpendicular to the other sensor axis; and
      another face extending from the other interior surface of the other first axial housing portion to the other interior surface of the other second housing portion;
   another buffer rod having another first axial end and another second axial end opposite the another first axial end and comprising:
      another first axial buffer portion arranged within the other first housing portion and comprising the another first axial end;
      another second axial buffer portion arranged within the other second housing portion and abutting the other face, and comprising the other second axial end; and
      another third axial buffer portion, extending axially between the other first axial buffer portion and the other second axial buffer portion, and having another third cross-sectional area, smaller than the other first cross-sectional area, perpendicular to the other sensor axis;
   another cavity defined between the other interior surface and the other third axial buffer portion; and
   another acoustic transceiver element acoustically mated to the another first axial end;
   wherein the other sensor axis is substantially aligned with the conduit axis.

6. The sensor of claim 4, further comprising:
   a fluid housing comprising:
      a fluid housing interior surface defining an axial fluid housing cavity;
      a first fluid port in fluidic communication with the axial fluid housing cavity; and
      a second fluid port in fluidic communication with the axial fluid housing cavity;
   wherein the tubular fluid conduit is in fluidic communication with the second fluid port and extends axially away from the fluid housing along the conduit axis at the first axial end, and the sensor housing is arranged within the first fluid housing such that the sensor axis is substantially aligned with the conduit axis.

7. The sensor of claim 6, further comprising:
   another sensor housing having another interior surface defining another sensor axis and another axial interior sensor housing cavity comprising:
      another first axial sensor housing portion having another first cross-sectional area perpendicular to the other sensor axis;
      another second axial sensor housing portion arranged adjacent to the other first axial sensor housing portion along the other sensor axis and having another second cross-sectional area larger than the other first cross-sectional area perpendicular to the other sensor axis; and
      another face extending from the other interior surface of the other first axial housing portion to the other interior surface of the other second housing portion;
   another buffer rod having another first axial end and another second axial end opposite the another first axial end and comprising:
      another first axial buffer portion arranged within the other first housing portion and comprising the another first axial end;
      another second axial buffer portion arranged within the other second housing portion and abutting the other face, and comprising the another second axial end; and
      another third axial buffer portion, extending axially between the other first axial buffer portion and the other second axial buffer portion, and having another third cross-sectional area, smaller than the other first cross-sectional area, perpendicular to the other sensor axis;
   another cavity defined between the other interior surface and the other third axial buffer portion;
   another acoustic transceiver element acoustically mated to the another first axial end; and
   another fluid housing comprising:
      another fluid housing interior surface defining another axial fluid housing cavity;
      another first fluid port in fluidic communication with the other axial fluid housing cavity; and another second fluid port in fluidic communication with the other axial fluid housing cavity;

wherein the tubular fluid conduit is in fluidic communication with the other second fluid port and extends axially away from the other fluid housing along the conduit axis at the second end, and the other sensor housing is arranged within the other first fluid housing such that the other sensor axis is substantially aligned with the conduit axis.

8. The sensor of claim 1, wherein the acoustic transceiver element comprises a piezoelectric element.

9. The sensor of claim 1, further comprising a matching layer affixed to the second end and having a thickness of about an odd multiple of $1/4\lambda$.

10. The sensor of claim 1, further comprising a backing abutted to the acoustic transceiver element axially opposite the first axial end.

11. A sensor system comprising:
a fluid housing comprising:
  a first fluid housing portion defining a first axial fluid housing cavity and comprising a first fluid port in fluidic communication with the first axial fluid housing cavity;
  a second fluid housing portion defining a second axial fluid housing cavity and comprising a second fluid port in fluidic communication with the second axial fluid housing cavity; and
  a tubular fluid conduit in fluidic communication with the first fluid port at a first end and in fluidic communication with the second fluid port at a second end opposite the first end, and defining a conduit axis;
a first sensor arranged within the first axial fluid housing cavity, axially aligned with the conduit axis; and
a second sensor arranged within the second axial fluid housing cavity, axially aligned with the conduit axis;
wherein one or both of the first sensor or the second sensor each comprises:
  a sensor housing having an interior surface defining a sensor axis and an axial interior sensor housing cavity comprising:
    a first axial sensor housing portion having a first cross-sectional area perpendicular to the sensor axis;
    a second axial sensor housing portion arranged adjacent to the first axial sensor housing portion along the sensor axis and having a second cross-sectional area larger than the first cross-sectional area perpendicular to the sensor axis; and
    a face extending from the interior surface of the first axial housing portion to the interior surface of the second housing portion;
  a buffer rod having a first axial end and a second axial end opposite the first axial end and comprising:
    a first axial buffer portion arranged within the first housing portion and comprising the first axial end;
    a second axial buffer portion arranged within the second housing portion and abutting the face, and comprising the second axial end; and
    a third axial buffer portion, extending axially between the first axial buffer portion and the second axial buffer portion, and having a third cross-sectional area, smaller than the first cross-sectional area, perpendicular to the sensor axis;
  a cavity defined between the interior surface and the third axial buffer portion; and
  an acoustic transceiver element acoustically mated to the first axial end.

12. The sensor system of claim 11, further comprising circuitry configured to:
  activate the first acoustic transceiver element to emit a first incident wave;
  activate the second acoustic transceiver element to emit a second incident wave;
  detect, by the first acoustic transceiver element, an echo of the first incident wave;
  determine a fluid acoustic impedance of a fluid in the tubular fluid conduit based on the echo;
  detect, by the second acoustic transceiver element, at least a first portion of the first incident wave;
  determine a first time of flight of the portion of the first portion;
  detect, by the first acoustic transceiver element, at least a second portion of the second incident wave;
  determine a second time of flight of the second portion; and
  determine a mass fluid flow rate based on the determined fluid acoustic impedance, the determined first time of flight, and the determined second time of flight.

13. The sensor system of claim 11, wherein the acoustic transceiver element is configured to emit a vibration having a predetermined wavelength ($\lambda$), and the buffer rod has an axial length of about a round multiple of $n/2\lambda$.

14. The sensor system of claim 11, wherein the third cross-sectional area is about half as large as the first cross-sectional area.

15. The sensor of claim 11, wherein the acoustic transceiver element comprises a piezo element.

16. The sensor system of claim 11, further comprising a matching layer affixed to the second end and having a thickness of about an odd multiple of $1/4\lambda$.

17. The sensor system of claim 11, further comprising a backing abutted to the acoustic transceiver element axially opposite the first axial end.

* * * * *

UNITED STATES PATENT AND TRADEMARK OFFICE
CERTIFICATE OF CORRECTION

PATENT NO. : 11,181,406 B2
APPLICATION NO. : 16/702152
DATED : November 23, 2021
INVENTOR(S) : Loos et al.

Page 1 of 1

It is certified that error appears in the above-identified patent and that said Letters Patent is hereby corrected as shown below:

In the Specification

Column 6, Line 2, after "system" insert -- . --;

Column 7, Line 54, delete "209a," and insert -- 209a. --;

Column 12, Line 25, delete "Cfuel" and insert -- $C_{fluid}$ --;

Column 12, Line 64, delete "$C_{dluid})t_3$" and insert -- $C_{fluid})t_3$ --;

Column 12, Line 65, delete "($c_{fluid}$" and insert -- ($C_{fluid}$ --;

Column 13, Line 30, delete "$r_{down}$" and insert -- $t_{down}$ --;

Column 13, Line 31, delete "$r_{up}$" and insert -- $t_{up}$ --;

Column 13, Line 47, delete "$t_{dn}$)" and insert -- $t_{down}$) --;

Column 14, Line 24, delete "$t_{dn}$)" and insert -- $t_{down}$) --;

In the Claims

Column 24, Line 44, Claim 15, after "sensor" insert -- system --.

Signed and Sealed this
Twenty-sixth Day of July, 2022

Katherine Kelly Vidal
*Director of the United States Patent and Trademark Office*